United States Patent
Mori et al.

(10) Patent No.: US 7,277,501 B2
(45) Date of Patent: Oct. 2, 2007

(54) DATA RECEIVING DEVICE

(75) Inventors: Kenichi Mori, Ibaraki (JP); Yoshio Urabe, Ikoma (JP); Koichiro Tanaka, Takaraduka (JP); Hideki Nakahara, Takaraduka (JP); Hitoshi Takai, Toyono-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 800 days.

(21) Appl. No.: 10/640,655

(22) Filed: Aug. 14, 2003

(65) Prior Publication Data

US 2004/0037370 A1   Feb. 26, 2004

(30) Foreign Application Priority Data

Aug. 23, 2002 (JP) ............................ 2002-243813

(51) Int. Cl.
*H03D 3/00* (2006.01)
*H03K 9/06* (2006.01)
(52) U.S. Cl. ...................... 375/322; 375/310
(58) Field of Classification Search .............. 375/322, 375/310
See application file for complete search history.

(56) References Cited

U.S. PATENT DOCUMENTS

| | | | | |
|---|---|---|---|---|
| 5,454,007 A | * | 9/1995 | Dutta | 375/322 |
| 5,504,774 A | * | 4/1996 | Takai et al. | 375/134 |
| 5,999,575 A | | 12/1999 | Tanaka et al. | |
| 6,563,859 B1 | * | 5/2003 | Oishi et al. | 375/148 |

FOREIGN PATENT DOCUMENTS

| | | |
|---|---|---|
| EP | 0 771 097 | 5/1997 |
| GB | 2 350 986 | 12/2000 |
| JP | 9-200165 | 7/1997 |
| JP | 2000-252866 | 9/2000 |
| JP | 3161146 | 2/2001 |

OTHER PUBLICATIONS

Li Yu et al., "A Novel Adaptive Mismatch Cancellation System for Quadrature IF Radio Receivers", IEEE Transactions on Circuits and Systems II: Analog and Digital Signal Processing, IEEE Inc., New York, US, vol. 46, No. 6, Jun. 1999, XP011013070, pp. 789-801.

(Continued)

*Primary Examiner*—David C. Payne
*Assistant Examiner*—Nader Bolourchi
(74) *Attorney, Agent, or Firm*—Wenderoth, Lind & Ponack, L.L.P.

(57) ABSTRACT

A data receiving device is provided enabling a reduction in the time required for extracting a partial band signal, and capable of being easily made in a simple structure as an LSI device without requiring a plurality of analog circuits having the same characteristics. The data receiving device includes: a first sampler for sampling an in-phase signal I(t) at every predetermined sampling period and outputting the sampled in-phase signal; a second sampler for sampling a quadrature signal at every predetermined sampling period and outputting the sampled quadrature signal; a partial band extracting section structured by a complex filter for extracting partial band signals $IB_r$, $QB_r$ from frequency components included in the sampled in-phase signal and the sampled quadrature signal; and first and second delay detection operating sections for performing a delay detecting process based on the partial band signals and outputting detection signals.

21 Claims, 27 Drawing Sheets

OTHER PUBLICATIONS

"A Wireless Modem using SR-chirp Spread Spectrum Scheme", Technical Report of IEICE (The Institute of Electronics, Information and Communication Engineers), Nov. 1995, pp. 27-32, (with English language abstract).

Koji Yamano et al., "An Analysis Filter Bank-Based Group Demodulator for Multi-Channel TDMA System", 1998 p. 426 (with partial English language translation).

* cited by examiner

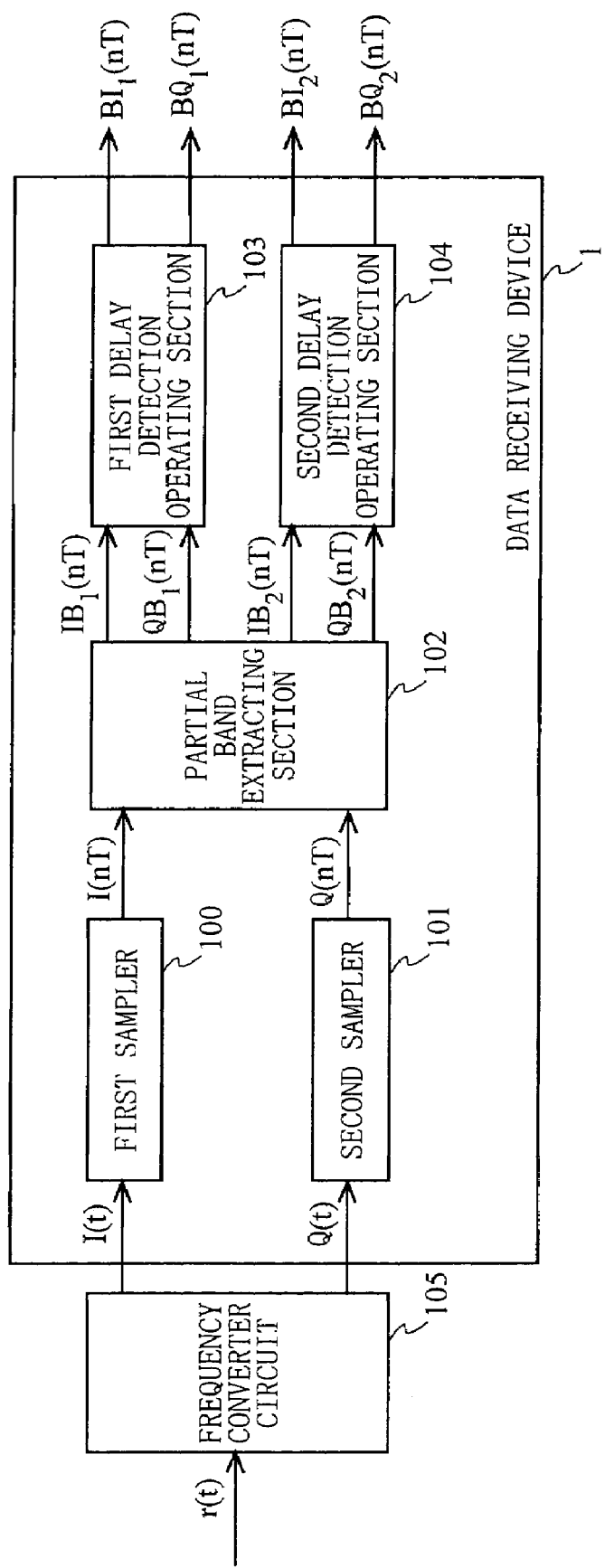

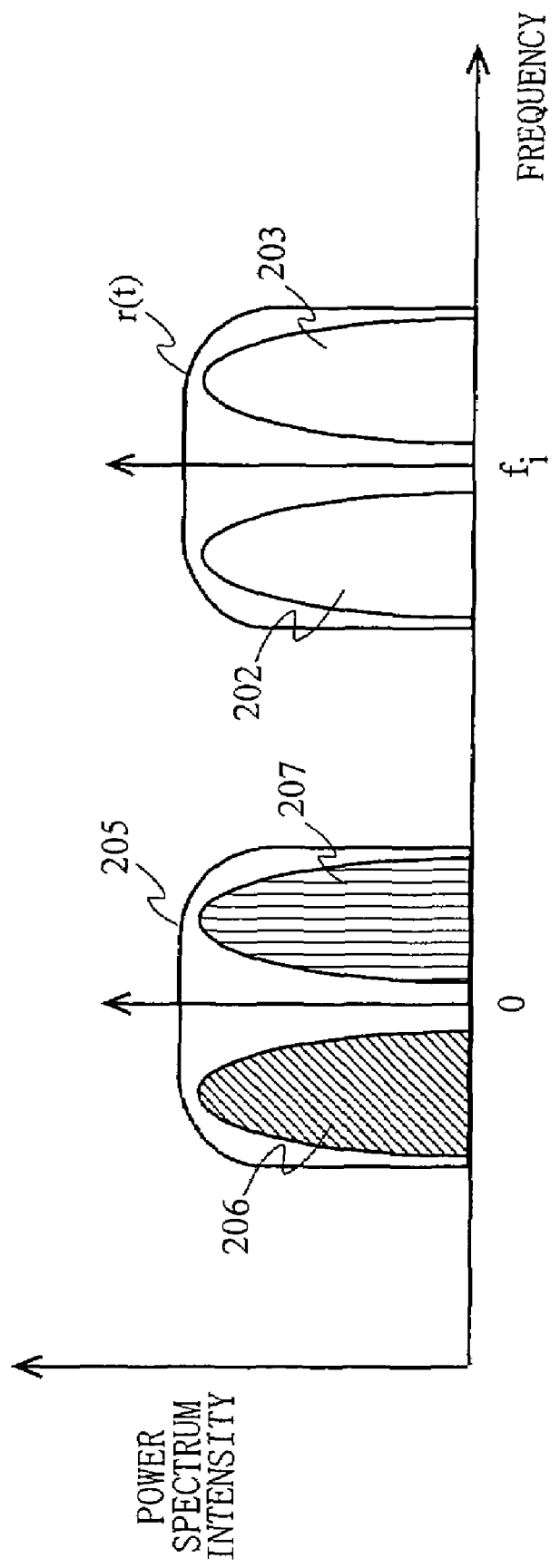

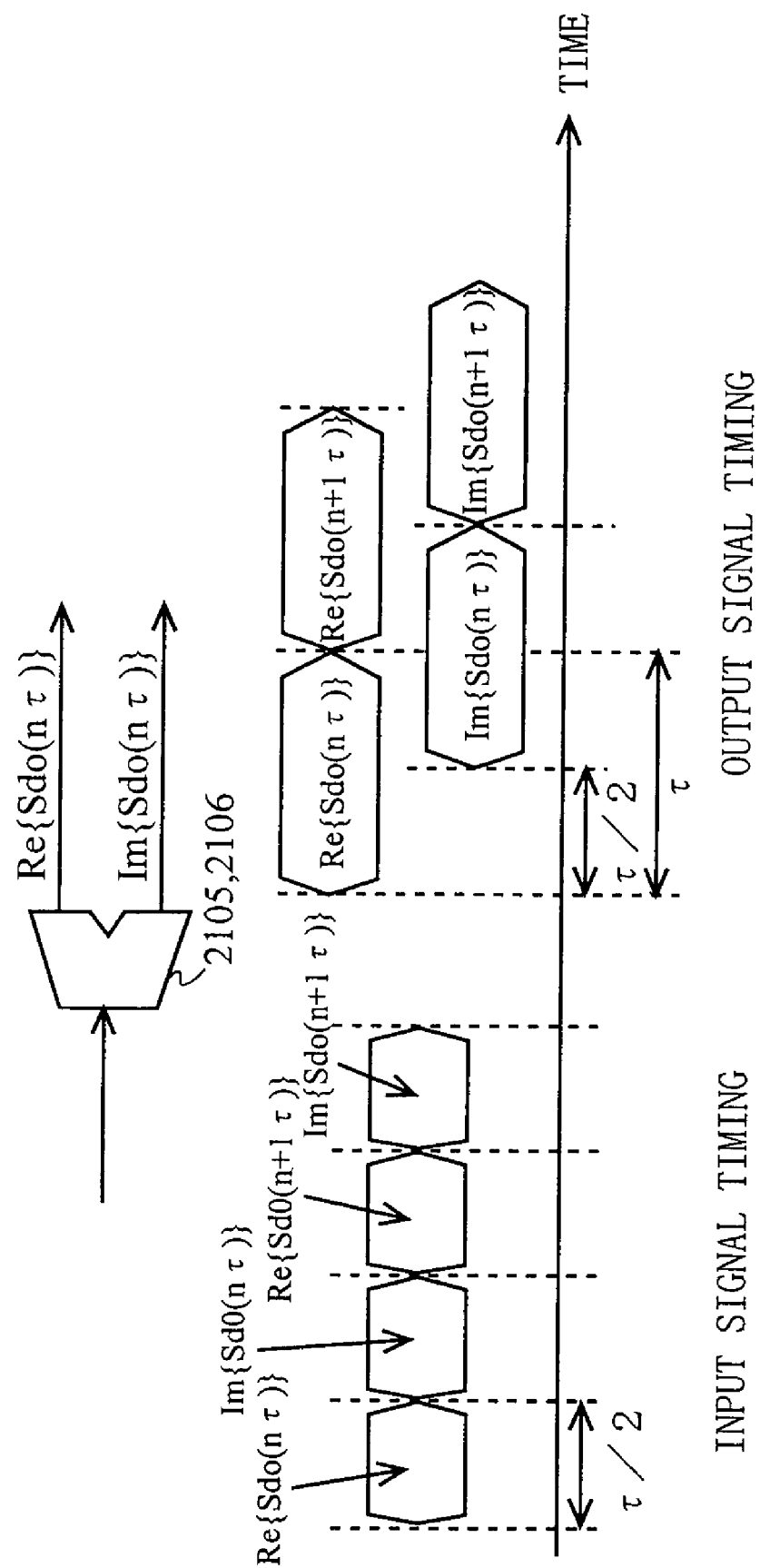

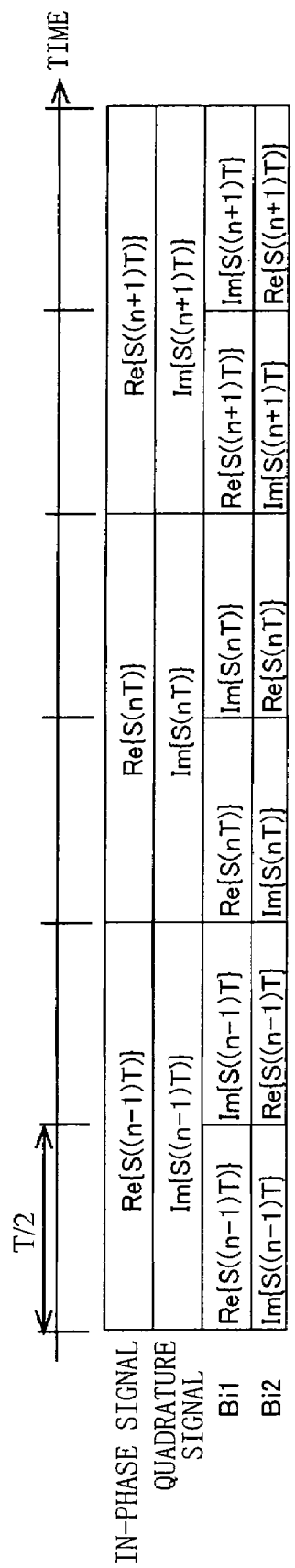
F I G. 1 3
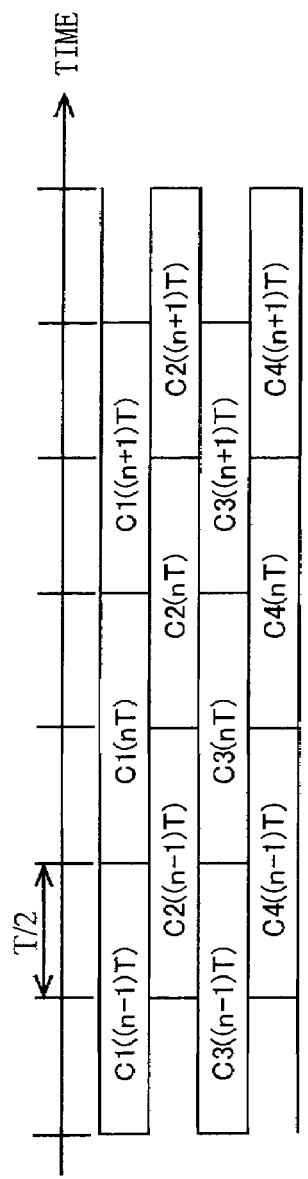
F I G. 1 4

DATA RECEIVING DEVICE

BACKGROUND OF THE INVENTION

1. Field of the Invention

The present invention relates to data receiving devices for demodulating a modulated signal and, more specifically, to a data receiving device for obtaining a detection signal from a phase-modulated signal through digital signal processing.

2. Description of the Background Art

Conventionally, devices for extracting at least a partial band signal from a received modulated signal for demodulation have been known. Examples of such devices include a data transmitting and receiving device disclosed in Japanese Patent No. 3161146 and a device disclosed in "A Wireless Modem using SR-chirp Spread Spectrum Scheme", Technical Report of IEICE (The Institute of Electronics, Information and Communication Engineers), RCS95-102.

FIG. 25 is an illustration showing the configuration of a data receiving device disclosed in Japanese Patent No. 3161146. In FIG. 25, the data receiving device includes a frequency mixer 1301, a band-pass filter (denoted as BPF in the drawing) 1302, a local oscillator 1303, a reception state determining section 1304, a delay unit 1305, a multiplier 1306, a low-pass filter (denoted as LPF in the drawing) 1307, and a decoder 1308.

The local oscillator 1303 outputs a local oscillation signal whose frequency can be changed at every interval of an integral multiple of a symbol frequency of the data to be received. The frequency mixer 1301 converts an input spread spectrum signal r(t) into a frequency band representing a difference in frequency band between the input spread spectrum signal r(t) and the local oscillation signal from the local oscillator 1303. Here, it is assumed that this spread spectrum signal r(t) is a phase-modulated signal which can be demodulated by extracting at least one partial band from the signal's frequency band.

The band-pass filter 1302 extracts and then outputs an intermediate signal b(t), which is part of frequency components of the spread spectrum signal r(t) frequency-converted by the frequency mixer 1301.

FIGS. 26A and 26B are illustrations showing signal spectra observed in the data receiving device illustrated in FIG. 25. FIG. 26A is an illustration showing an outline of spectra of the received spread spectrum signal r(t). The local oscillation signal output from the local oscillator 1303 can have three frequencies. Each frequency of the local oscillation signal is an integral multiple of the symbol frequency of the data signal to be received. The center frequency of the local oscillation signal is any one of center frequencies of three partial bands denoted as B1, B2, and B3, respectively.

FIG. 26B is an illustration showing an outline of a spectrum of the intermediate signal b(t). The intermediate signal b(t) is any one of partial bands of B1, B2, and B3 that is obtained by frequency-converting the input spread spectrum signal r(t) and then band-limiting the frequency-converted signal.

The reception state determining section 1304 outputs a band switching signal in accordance with a data reception state so as to switch the frequency of the local oscillation signal output from the local oscillator 1303. Based on the band switching signal output from the reception state determining section 1304, the local oscillator 1303 switches the frequency of the local oscillation signal for output. With this, any one of the partial bands of B1, B2, and B3 is selected.

Therefore, the band-pass filter 1302 outputs the intermediate signal b(t) corresponding to the partial band after selection.

The multiplier 1306 multiplies the intermediate signal b(t) by an intermediate signal b(t-Ts) obtained by the delay unit 1305 delaying the intermediate signal b(t) by a symbol period Ts, and then supplies the resultant signal to the low-pass filter 1307. The low-pass filter 1307 performs a low-pass filtering process on the received signal, and then outputs a detection signal c(t). The decoder 1308 decides the polarity of the detection signal c(t), and then outputs a data signal dat(t).

FIG. 27 is a block diagram illustrating the general configuration of a receiving unit in a wireless modem disclosed in "A Wireless Modem using SR-chirp Spread Spectrum Scheme", Technical Report of IEICE, RCS95-102. In FIG. 27, the receiving unit includes a splitter 1501, a first frequency mixer 1502, a second frequency mixer 1503, a first local oscillator 1504, a second local oscillator 1505, a first band-pass filter 1506, a second band-pass filter 1507, a first gain controller (denoted as AGC1 in the drawing) 1508, a second gain controller (denoted as AGC2 in the drawing) 1509, a first quadrature detector 1510, a second quadrature detector 1511, and a baseband signal processing section 1512.

The receiving unit receives a spread spectrum signal as an input signal, extracts two partial bands simultaneously, and then outputs the received data in accordance with the reception state. This receiving unit has two receiving systems identical in structure to each other, one starting from the first frequency mixer 1502 to the baseband signal processing section 1512 and the other starting from the second frequency mixer 1503 to the baseband signal processing section 1512. The operation of the receiving unit illustrated in FIG. 27 is described below.

The splitter 1501 splits a received spread spectrum signal r(t) into two signals, one being supplied to the first frequency mixer 1502 and the other being supplied to the second frequency mixer 1503. The first local oscillator 1504 and the second local oscillator 1505 output local oscillation signals whose center frequencies are of bands of different band characteristics. The local oscillation signal output from the local oscillator 1504 is supplied to the frequency mixer 1502. The local oscillation signal output from the local oscillator 1505 is supplied to the frequency mixer 1503.

The frequency mixer 1502 converts the split spread spectrum signal r(t) into a signal of a frequency band representing a difference between the split spread spectrum signal and the local oscillation signal output from the local oscillator 1504, and then supplies the resultant signal to the first band-pass filter 1506. The first band-pass filter 1506 extracts a partial signal from the received signal for output to the first gain controller 1508 as a partial band signal b1(t). The first gain controller 1508 controls the amplitude of the partial band signal b1(t) for output to the first quadrature detector 1510. The first quadrature detector 1510 outputs an in-phase component I1(t) and a quadrature component Q1(t) of a first complex baseband signal output from the first gain controller 1508.

The other receiving system starting from the second frequency mixer 1503 operates in the same manner as described above. As a result, the second quadrature detector 1511 outputs an in-phase component I2(t) and a quadrature component Q2(t) of a second complex baseband signal output from the second gain controller 1509. The baseband signal processing section 1512 performs a delay detecting process on a set of I1(t) and Q1(t) of the first complex baseband signal and a set of I2(t) and Q2(t) of the second complex baseband signal. The baseband signal processing section 1512 then outputs the received data of one of the receiving systems which is determined as having less errors based on, for example, the reception state of these receiving systems. Alternatively, the receiving system can be selected based on the reception level for outputting the received data.

FIG. 28 is an illustration showing one example of a structure of a delay detector provided in the baseband signal processing section 1512. In the baseband signal processing section 1512, one delay detector is provided correspondingly to each of the quadrature detectors. In FIG. 28, only one delay detector is representatively illustrated. In FIG. 28, the delay detector includes a first sampler 1101, a second sampler 1102, a delay detection operating section 1103, a first post-detection filter 1104, and a second post-detection filter 1105.

The first sampler 1101 samples the in-phase component i(t) of the complex baseband signal (I1(t) or I2(t) in FIG. 27) to output an in-phase component data string I(nT) of the sampled complex baseband signal to the delay detection operating section 1103. Here, n is an integer (n= . . . −1, 0, 1, . . . ), and T is a sampling period. Similarly, the second sampler 1102 samples the quadrature component q(t) of the complex baseband signal (Q1(t) or Q2(t) in FIG. 22) to output a quadrature component data string Q(nT) of the sampled complex baseband signal to the delay detection operating section 1103.

FIG. 29 is an illustration showing the structure of the delay detection operating section 1103. In FIG. 29, the delay detection operating section 1103 includes a first selector 1201, a second selector 1202, a delay unit 1203, a sign changer 1204, a first multiplier 1205, and a second multiplier 1206. The first selector 1201 alternately selects the data strings I(nT) and Q(nT) for each sampling period, and then outputs the selected data string as S1(nT). The second selector 1202 alternately selects a data string −I(nT) output from the sign changer 1204 by reversing the sign of the data string I(nT) and the data string Q(nT) for each sampling frequency T, and then outputs the selected data string as S2(nT).

It is set so that, upon a selection of I(nT) by the first selector 1201, the second selector 1202 always selects Q(nT). It is also set so that, upon a selection of Q(nT) by the first selector 1201, the second selector 1202 always selects −I(nT).

The delay unit 1203 receives the data string S1(nT) as an input signal, and then outputs a signal by delaying S1(nT) by one symbol time length kT. Here, k represents the number of samplings per symbol. With this, the first multiplier 1205 alternately outputs, for each sampling period T, I(nT)I{(n−k)T}, which is the product of the in-phase component data string of the sampled complex baseband signal and the delayed in-phase component data string thereof, and Q(nT)Q{(n−k)T}, which is the product of the quadrature component data string of the sampled complex baseband signal and the delayed quadrature component data string thereof. The output from the first multiplier 1205 is referred to as a signal F1(nT). The second multiplier 1206 alternately outputs, for each sampling period T, I{(n−k)T}Q(nT), which is the product of the delayed in-phase component data string of the sampled complex baseband signal and the quadrature component data string thereof, and −I(nT)Q{(n−k)T}, which is the product of the sign-changed in-phase component data string of the sampled complex baseband signal and the delayed quadrature component data string thereof. The output from the second multiplier 1206 is referred to as a signal F2(nT).

The first post-detection filter 1104 performs a low-pass filtering process on the received signal F1(nT) to output a signal D1(nT), which is equivalent to a signal obtained by adding I(nT)I{(n−k)T} and Q(nT)Q{(n−k)T}. Similarly, the second post-detection filter 1105 performs a low-pass filtering process on the received signal F2(nT) to output a signal D2(nT), which is equivalent to a signal obtained by adding I{(n−k)T}Q(nT) and −I(nT)Q{(n−k)T}.

D1(nT) corresponds to an in-phase component of the multiplication result obtained by multiplying a complex number of A(nT)=I(nT)+jQ(nT) and a complex conjugate of A{(n−k)T}, which is delayed from A(nT) by one symbol time length kT. D2(nT) corresponds to a quadrature component of the above-stated multiplication result. Here, I(nT) represents an in-phase component, Q(nT) represents a quadrature component, and j represents an imaginary unit. Therefore, a phase represented by D1(nT) and D2(nT) shows a difference in phase between A(nT) and A{(n−k)T}. For this reason, by using D1(nT) and D2(nT), the received data can be demodulated through a decision circuit (not shown), for example.

As such, in order to obtain a plurality of demodulating signals for a plurality of partial band signals, the receiving unit illustrated in FIG. 27 obtains different complex baseband signals from partial band signals of different frequency band characteristics, and then performs a delay detection operation on each complex baseband to obtain the demodulating signals. Then, based on the reception state, the receiving unit outputs the received data.

In FIG. 27, a case is illustrated in which the number of partial bands to be extracted is two. If three or more partial bands are to be extracted, receiving systems are required as many as the number of partial bands to be extracted, the receiving systems each having the same structure as described above starting from a frequency mixer to a baseband signal processing section.

However, if the data transmitting and receiving device disclosed in Japanese Patent No. 3161146 is used to extract different partial band signals, the frequency of the local oscillator has to be changed. The changing operation disadvantageously takes a certain time.

On the other hand, in the receiving unit disclosed in "A Wireless Modem using SR-chirp Spread Spectrum Scheme", Technical Report of IEICE, RCS95-102, a plurality of local oscillators are provided in advance. Therefore, the operation of switching the partial band signal to be extracted does not take a long time. However, the receiving unit requires a plurality of analog receiving systems having the same structure starting from a frequency mixer and a baseband signal processing section. In order to equalize the characteristics of these receiving systems, analog circuits included in these systems are required to have approximately the same characteristics. Moreover, the requirement of a plurality of receiving systems causes an increase in hardware structure.

Still further, the hardware structure of the delay detection operating section 1103 in the baseband signal processing section 1512 (refer to FIG. 29) has some disadvantages. For example, signals undesired for demodulation have to be eliminated in advance by using an analog circuit from the complex baseband signal, which is an input signal of the delay detection operating section 1103.

Also, the delay detection operating section 1103 requires one sign changer, two selectors, one delay unit, and two multipliers. Moreover, the delay detector requires two post-detection filters. Therefore, the size of gates is large for LSI, for example, which is not suitable for reduction in size and weight.

SUMMARY OF THE INVENTION

Therefore, an object of the present invention is to provide a data receiving device which extracts at least a partial band signal from a received phase-modulated signal to obtain a detection signal through delay detection. The device enables reduction in time required for extracting the partial band signal, and is capable of being easily made in a simple structure as an LSI device without requiring a plurality of analog circuits having the same characteristics.

The present invention is directed to a data receiving device which is supplied with an in-phase signal and a quadrature signal that are obtained by frequency-converting a phase-modulated signal, performs a quadrature detecting process on the frequency-converted signal, and then outputs a detection signal. The data receiving device includes a first sampler, a second sampler, a partial band extracting section, and a delay detection operating section. The first sampler samples the in-phase signal at every predetermined sampling period and outputs the sampled in-phase signal. The second sampler samples the quadrature signal at every said predetermined sampling period and outputs the sampled quadrature signal. The partial band extracting section is structured by a complex filter for extracting at least one partial band from frequency components included in the sampled in-phase signal output from the first sampler and the sampled quadrature signal output from the second sampler and outputting a partial band signal of the partial band. The delay detection operating section performs the delay detecting process based on the partial band signal output from the partial band extracting section and outputs the detection signal.

With this, in the data receiving device, the partial band extracting section structured by a digital circuit extracts a partial band signal and, based on the partial band signal, performs a delay detecting process to output a signal for obtaining a demodulating signal. That is, extraction of a partial band signal is performed through digital processing. Therefore, it is possible to provide a data receiving device without requiring analog circuits as many as the number of partial band signals to be extracted or requiring time for switching partial band signals. Thus, the hardware structure can be downsized. Furthermore, signals other than those of the required partial bands are eliminated by the partial band extracting section. Therefore, it is not required to eliminate undesired signals, such as interference, by using an analog circuit.

Preferably, the partial band extracting section extracts at least one partial band whose center frequency is not 0, and outputs a partial band signal of the partial band as being separated into an in-phase component and a quadrature component. With this, the partial band signal becomes an intermediate-frequency signal whose center frequency is not 0. Therefore, a vector operation is not required, thereby simplifying the structure of the delay detection operating section.

Also, the partial band extracting section can extract the partial band so that a center frequency of the partial band signal has a value of an integral multiple of a symbol frequency of transmission data. With this, no undesired phase rotation component occurs, thereby simplifying the structure of the delay detection operating section, which performs an operation equivalent to a delay detection operation using a complex base band signal.

Furthermore, the partial band extracting section can extract the partial band so that the number of samplings within one symbol period has a value obtained by dividing the center frequency of the partial band signal to be extracted by a symbol frequency and then multiplying the division result by 8. With this, a tap coefficient multiplier whose tap coefficient is 0 can be omitted. Also, as for a part of the tap coefficients, the in-phase component and the quadrature component can be shared. Therefore, the number of tap coefficient multipliers of the partial band extracting section can be further reduced.

Still further, the partial band extracting section can extract an even number of partial bands and output an even number of partial band signals. These partial band signals are formed by a pair(s) of signals whose center frequencies are a positive frequency and a negative frequency that are equally distanced apart from a frequency of 0. With this, in the structure of the complex filter for extracting a pair of partial band signals, a convolutional integration operation can be shared, thereby simplifying the structure of the partial band extracting section.

Specifically, the delay detection operating section includes a delay unit, a first multiplier, a second multiplier, a first low-pass filter, and a second low-pass filter. The delay unit delays the in-phase component of the partial band signal output from the partial band extracting section by one symbol time and outputs the delayed in-phase component. The first multiplier multiplies the in-phase component of the partial band signal output from the partial band extracting section by the delayed in-phase component and outputs the multiplication result as an in-phase component data string. The second multiplier multiplies the quadrature of the partial band signal output from the partial band extracting section by the delayed in-phase component and outputs the multiplication result as a quadrature component data string. The first low-pass filter filters a high-frequency component of the in-phase component data string output from the first multiplier. The second low-pass filter filters a high-frequency component of the quadrature component data string output from the second multiplier. With this, the delay detection operating section can be achieved by one delay unit, two multipliers, and two low-pass filters. Therefore, it is possible to achieve the delay detection operating section having a hardware structure smaller than that of a conventional delay detection operating section.

Furthermore, the partial band extracting section can include a first filtering unit, a second filtering unit, a third filtering unit, a fourth filtering unit, a first subtractor, a first adder, a second subtractor, and a second adder. The first filtering unit is structured by a first complex filter for finding a convolutional integral of the sampled in-phase signal and a quadrature component of a transfer function of the first complex filter. The second filtering unit is structured by a second complex filter for finding a convolutional integral of the sampled quadrature signal and an in-phase component of a transfer function of the second complex filter. The third filtering unit is structured by a third complex filter for finding a convolutional integral of the sampled quadrature signal and a quadrature component of a transfer function of the third complex filter. The fourth filtering unit structured by a fourth complex filter for finding a convolutional integral of the sampled in-phase signal and a quadrature component of a transfer function of the fourth complex filter. The first subtractor subtracts a signal output from the second filtering unit from a signal output from the first filtering unit.

The first adder adds the signal output from the first filtering unit and the signal output from the second filtering unit. The second subtractor subtracts a signal output from the fourth filtering unit from a signal output from the third filtering unit. The second adder adds the signal output from the third filtering unit and the signal output from the fourth filtering unit. With this, the partial band extracting section can be achieved with a simple structure.

Alternatively, the partial band extracting section can include a first input selector, a second input selector, a first filtering unit, a second filtering unit, a first output selector, a second output selector, a first delay unit, a second delay unit, a first subtractor, a first adder, a second subtractor, and a second adder. The first input selector is supplied with the sampled in-phase signal and the sampled quadrature signal for alternately selecting and outputting the sampled in-phase signal and the sampled quadrature signal at every half of the sampling period. The second input selector is supplied with the sampled in-phase signal and the sampled quadrature signal for alternately selecting and outputting the sampled in-phase signal and the sampled quadrature signal at every half of the sampling period. The first filtering unit is structured by a first complex filter for finding a convolutional integral of the signal output from the first input selector and an in-phase component of a transfer function of the first complex filter. The second filtering unit is structured by a second complex filter for finding a convolutional integral of the signal output from the second input selector and a quadrature component of a transfer function of the second complex filter. The first output selector outputs the signal output from the first filtering unit and varied at every half of the sampling period alternately to a first output terminal and a second output terminal that are provided to the first output selector. The second output selector outputs the signal output from the second filtering unit and varied at every half of the sampling period alternately to a third output terminal and a fourth output terminal that are provided to the second output selector. The first delay unit delays the signal output from the first output terminal of the first output selector by a time which is half of the sampling period. The second delay unit delays the signal output from the third output terminal of the second output selector by the time which is half of the sampling period. The first subtractor subtracts the delayed signal output from the second delay unit from the delayed signal output from the first delay unit. The first adder adds the delayed signal output from the first delay unit and the delayed signal output from the second delay unit. The second subtractor subtracts the signal output from the fourth output terminal of the second output selector from the signal output from the second output terminal of the first output selector. The second adder adds the signal output from the second output terminal of the first output selector and the signal output from the fourth output terminal of the second output selector. With this, the partial band extracting section can be achieved with a simplified structure.

Preferably, the partial band extracting section extracts the partial band so that a center frequency of the partial band signal has a value of an integral multiple of a symbol frequency of transmission data. With this, no undesired phase rotation component occurs, thereby simplifying the structure of the delay detection operating section.

Furthermore, the partial band extracting section can extract the partial band so that the number of samplings within one symbol period has a value obtained by dividing the center frequency of the partial band signal to be extracted by a symbol frequency and then multiplying the division result by 8. With this, a tap coefficient multiplier whose tap coefficient is 0 can be omitted. Also, as for a part of the tap coefficients, the in-phase component and the quadrature component can be shared. Therefore, the number of tap coefficient multipliers in the filtering unit can be further reduced.

Preferably, the delay detection operating section performs a delay detecting process by using the partial band signal output from the partial band extracting section as the intermediate signal. With this, the phase rotation component included in the intermediate-frequency signal can be used thereby simplifying the structure of the delay detection operating section.

Preferably, the modulated signal is a signal having a frequency band from which at least one partial band is extracted to obtain a partial band signal that can be demodulated. This makes it easy to obtain a partial band signal that can be demodulated from the modulated signal.

Preferably, the modulated signal is a spread spectrum signal. Using such a generally-used spread spectrum signal is practically effective.

Preferably, the modulated signal can be a spread spectrum signal obtained by using, as a spreading signal, a chirp signal obtained through repeated sweeping of a sine-wave frequency at every predetermined period. Using such a generally-used chirp signal obtained through repeated sweeping of the sine-wave frequency at every predetermined period is practically effective.

In a preferred embodiment, the above data receiving device is used in a wireless communications device. The wireless communications device may perform a receiving process by selecting one of a plurality of pieces of received data obtained based on a plurality of partial bands, may integrate these pieces of received data to obtain one piece of received data, or may perform a concurrent process on the pieces of received data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustration showing the configuration of a data receiving device 1 according to a first embodiment of the present invention;

FIG. 2 is an illustration showing signal spectra for broadly describing how an in-phase component 1 (t) and a quadrature component Q(t) of a complex baseband signal are obtained from a high-frequency signal supplied to a frequency converter circuit 105;

FIG. 12 is a timing chart showing the operation of a first output selector 2105 or a second output selector 2106;

FIG. 13 is a timing chart showing signals output from the first input selector 2101 and the second input selector 2102;

FIG. 14 is a timing chart showing signals output from the first output selector 2105 and the second output selector 2106;

DESCRIPTION OF THE PREFERRED EMBODIMENTS

First Embodiment

Figure 3:
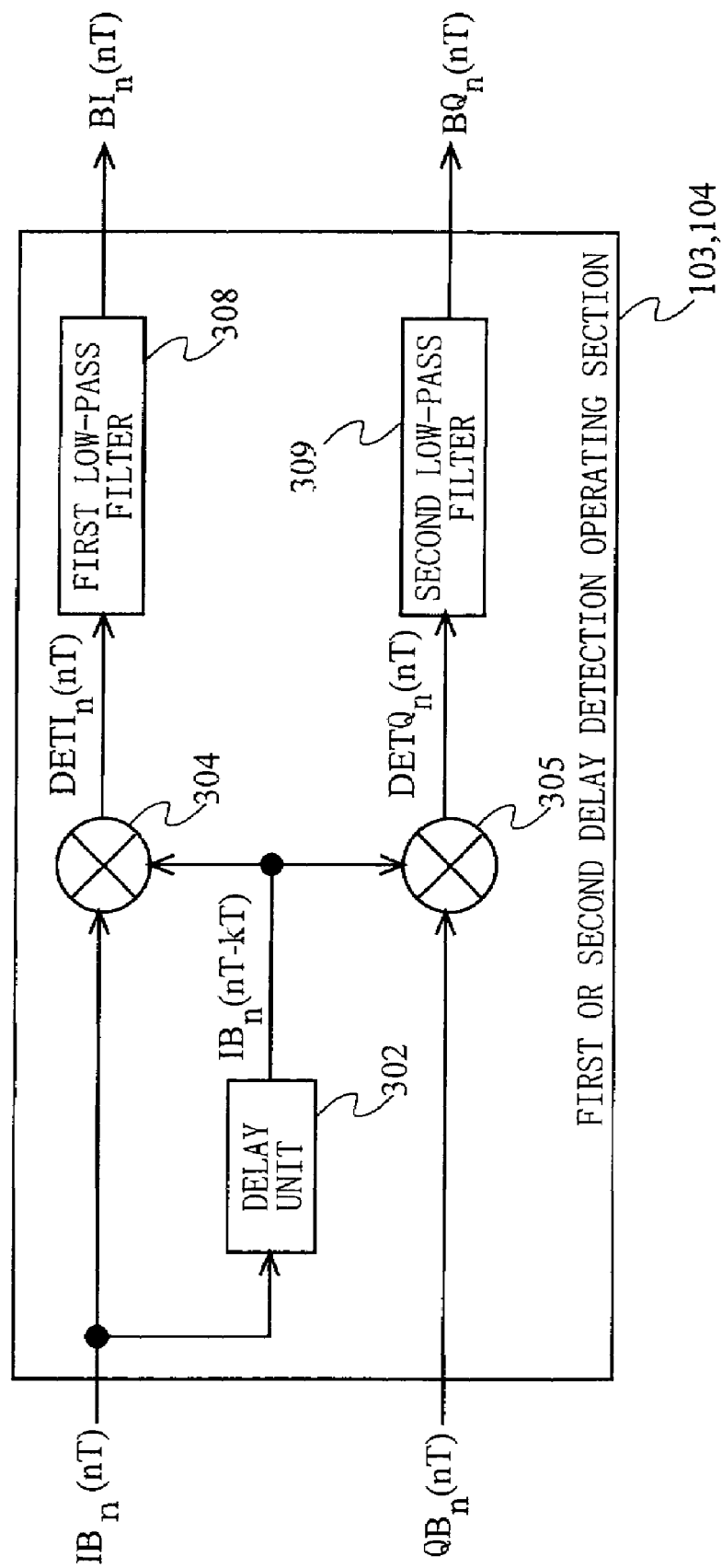
FIG. 3 is an illustration showing the structure of a first delay detection operating section 103 or a second delay detection operating section 104 in FIG. 1.

FIG. 1 is an illustration showing the configuration of a data receiving device 1 according to the first embodiment of the present invention. The data receiving device 1 extracts at least one partial band signal from frequency components of a received phase-modulated signal, and then obtains a detection signal through delay detection. In FIG. 1, the data receiving device 1 includes a first sampler 100, a second sampler 101, a partial band extracting section 102, a first delay detection operating section 103, and a second delay detection operating section 104. The first sampler 100 and the second sampler 101 have connected prior thereto a frequency converter circuit 105.

FIG. 2 is an illustration showing signal spectra for broadly describing how an in-phase component I(t) and a quadrature component Q(t) of a complex baseband signal are obtained from a high-frequency signal supplied to the frequency converter circuit 105. With reference to FIGS. 1 and 2, the operations of the frequency converter circuit 105 and the data receiving device 1 are described below.

In FIG. 2, a high-frequency modulated signal r(t) is a high-frequency signal obtained through a scheme typified by a spread spectrum scheme, and is supplied to the frequency converter circuit 105. It is assumed herein that the center frequency of the high-frequency modulated signal r(t) is $f_i$. Also, it is assumed herein that the high-frequency modulated signal r(t) includes a first partial band high-frequency modulated signal 202 and a second partial band high-frequency modulated signal 203. Each of these partial band high-frequency modulated signals is a signal that can be demodulated by itself. Here, for convenience in description, the high-frequency modulated signal r(t) includes two partial band high-frequency modulated signals 202 and 203. Alternatively, three or more partial band high-frequency modulated signals can be included.

Figure 27:
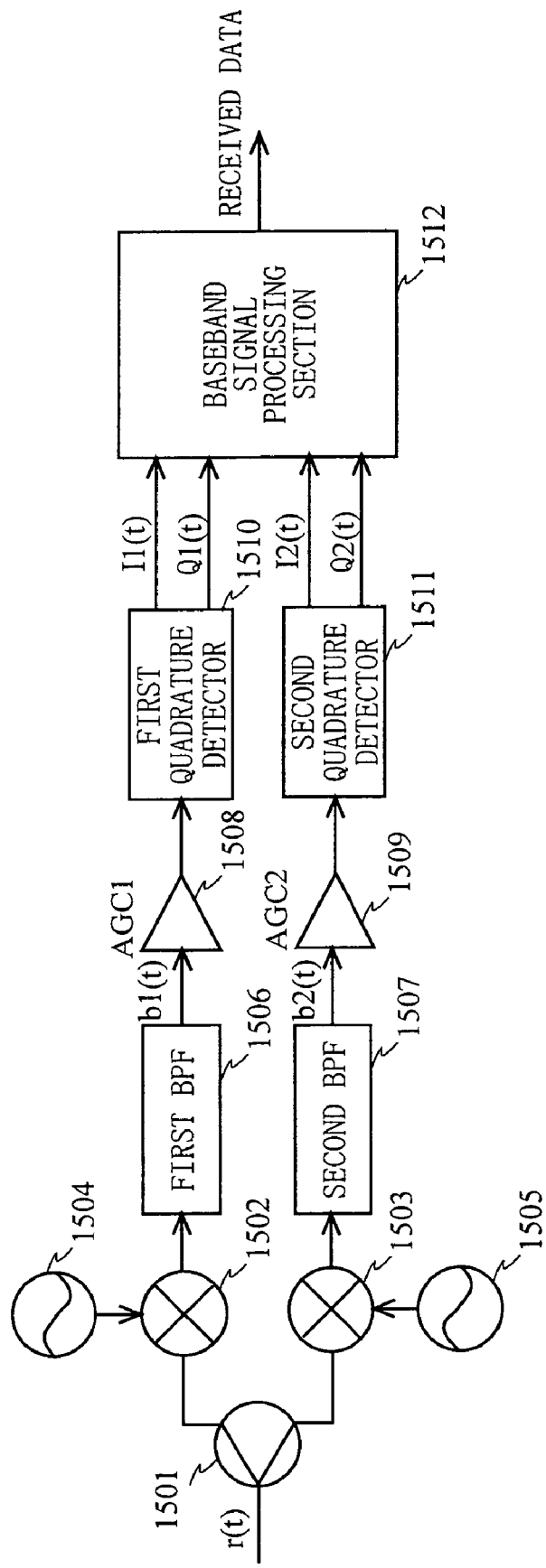
FIG. 27 is a block diagram illustrating the configuration of a receiving unit in a wireless modem disclosed in "A Wireless Modem using SR-chirp Spread Spectrum Scheme", Technical Report of IEICE, RCS95-102.
Figure 28:
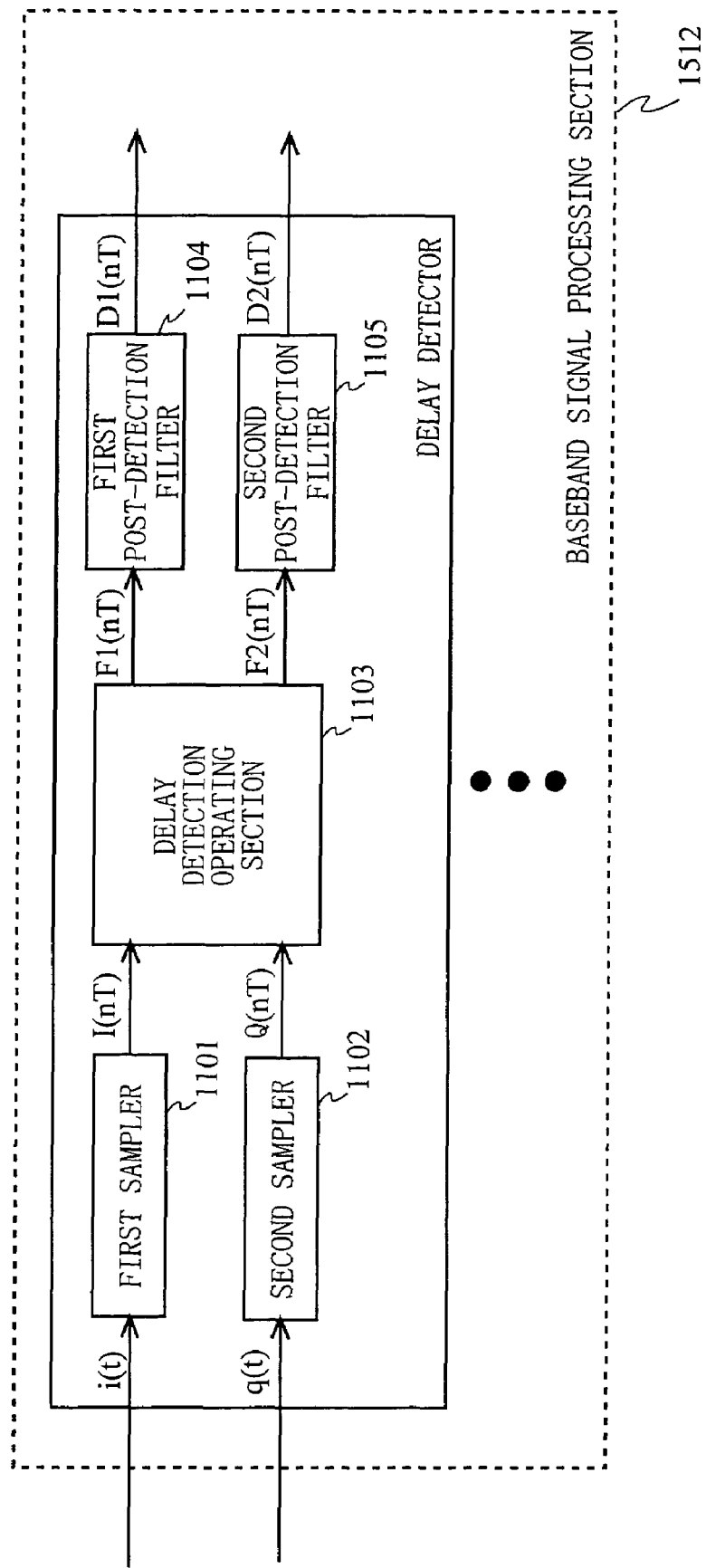
FIG. 28 is an illustration showing one example of a structure of a delay detector provided in the baseband signal processing section 1512.

The frequency converter circuit 105 is a known analog circuit typically illustrated in FIG. 27, including one frequency converter, one local oscillator, one band-pass filter, one gain controller, and one quadrature detector. The frequency converter circuit 105 frequency-converts the input high-frequency modulated signal r(t) to a signal having its center frequency of 0, and then performs a low-pass filtering process on the resultant signal. With this, the high-frequency modulated signal r(t) is converted to a complex baseband signal 205 having the center frequency of 0, the first partial band high-frequency modulated signal 202 is converted to a first partial band complex signal 206, and the second partial band high-frequency modulated signal 203 is converted to a second partial band complex signal 207.

The frequency converter circuit 105 outputs the in-phase component I(t) of the complex baseband signal 205 to the first sampler 100 and the quadrature component Q(t) thereof to the second sampler 101. The in-phase component I(t) and the quadrature component Q(t) each have mixed therein signals having the same spectra as those of the first partial band complex signal 206 and the second partial band complex signal 207.

The first sampler 100 samples the in-phase component I(t) of the complex baseband signal supplied by the frequency converter circuit 105 to output an in-phase component data string I(nT) of the complex baseband signal to the partial band extracting section 102. It is assumed herein that n is an integer (n= ..., −1, 0, 1, ...) and T is a sampling period. The second sampler 101 samples the quadrature component Q(t) of the received complex baseband signal to output a quadrature component data string Q(nT) of the complex baseband signal to the partial band extracting section 102. Note that the in-phase component data string of the complex baseband signal is also hereinafter referred to as a sampled in-phase component. Further, note that the quadrature component data string of the complex baseband signal is also hereinafter referred to as a sampled quadrature component.

The in-phase data string I(nT) and the quadrature component data string Q(nT) are signals obtained by sampling I(t) and Q(t), respectively, at every sampling period T. Therefore, a quadrature relation established between I(t) and Q(t) also holds between I(nT) and Q(nT).

The partial band extracting section 102 is implemented by a complex filter, which extracts and outputs m in-phase components (in-phase component data strings) $IB_r(nT)$ of the same band in a partial band signal of the received in-phase component data string I(nT) and m quadrature components (quadrature component data strings) $QB_r(nT)$ of the same band in the partial band signal of the received quadrature component data string Q(nT), where r=1, 2, 3, ..., m, and m is a positive integer (m=1, 2, 3, ...). These in-phase component data strings $IB_r(nT)$ and quadrature component data strings $QB_r(nT)$ are extracted so as not to have the center frequency of 0. In FIG. 1, a case is exemplarily illustrated where m=2. These in-phase component data strings $IB_r(nT)$ and quadrature component data strings $QB_r(nT)$ hold quadrature characteristics of I(nT) and Q(nT).

The first partial band complex signal 206 has an in-phase component data string $IB_1(nT)$ as an in-phase component and a quadrature component data string $QB_1(nT)$ as a quadrature component. Similarly, the second partial band complex signal 207 has an in-phase component data string $IB_2(nT)$ as an in-phase component and a quadrature component data string $QB_2(nT)$ as a quadrature component.

As illustrated in FIG. 2, the in-phase component data string $IB_1(nT)$, the quadrature component data string $QB_1(nT)$, the in-phase component data string $IB_2(nT)$, and the quadrature component data string $QB_2(nT)$ do not include a direct-current component. Therefore, signals that carry these data strings are intermediate-frequency signals including therein a phase rotation component.

The partial band extracting section 102 extracts a partial band signal required for obtaining a demodulating signal from the complex baseband signal. Therefore, undesired signals included in I(t) and Q(t) of the input signal are eliminated. For example, in order to extract the first partial band complex signal 206, the partial band extracting section 102 eliminates all signals having frequencies other than the frequency of the first partial band complex signal 206.

The partial band extracting section 102 supplies the in-phase component data string $IB_1(nT)$ and the quadrature component data string $QB_1(nT)$ to the first delay detection operating section 103. Also, the partial band extracting section 102 supplies the in-phase component data string $IB_2(nT)$ and the quadrature component data string $QB_2(nT)$ to the second delay detection operating section 104.

Based on the received in-phase component data string $IB_1(nT)$ and quadrature component data string $QB_1(nT)$, the first delay detection operating section 103 outputs an in-phase component data string $IB_1(nT)$ and a quadrature component data string $QB_1(nT)$ of a partial band detection signal. Based on the received in-phase component data string $IB_2(nT)$ and quadrature component data string $QB_2(nT)$, the second delay detection operating section 104 outputs an in-phase component data string $BI_2(nT)$ and a quadrature component data string $BQ_2(nT)$ of a partial band detection signal.

The first delay detection operating section 103 and the second delay detection operating section 104 are connected at their output stages to a decision circuit (not shown). The decision circuit (not shown) decides a phase polarity of each of the partial band detection signals. This decision is made based on the in-phase component data string $BI_1(nT)$ and the quadrature component data string $BQ_1(nT)$ output from the first delay detection operating section 103 and the in-phase component data string $BI_2(nT)$ and the quadrature component data string $BQ_2(nT)$ output from the second delay detection operating section 104. Then, in accordance with the reception state, such as the number or errors or CRC errors, the decision circuit outputs the reception data of the partial band signal that is more appropriate.

FIG. 3 is an illustration showing the structure of the first delay detection operating section 103 or the second delay detection operating section 104 in FIG. 1. Since the first and second delay detection operating sections 103 and 104 have the same structure, descriptions are hereinafter made representatively to the first delay detection operating section 103. In FIG. 3, the first delay detection operating section 103 includes a delay unit 302, a first multiplier 304, a second multiplier 305, a first low-pass filter 308, and a second low-pass filter 309.

The operation of the first delay detection operating section 103 is described below.

A partial band signal S(nT), which is a signal supplied to the first delay detection operating section 103, can be expressed in complex notation as the following Equation 1.

$$S(nT)=a(nT)\exp(j\cdot\omega\cdot nT) \quad (1)$$

Here, a(nT) is a complex baseband signal when the partial band signal is represented in a baseband, and ω is an angular frequency of the center frequency of the partial band signal.

The in-phase component data string $IB_r(nT)$ and the quadrature component data string $QB_r(nT)$ of the partial band signal correspond to the in-phase component of S(nT) and the quadrature component thereof, respectively, and are therefore expressed as the following Equation 2, where r=1 in the case of the first delay detection operating section 103.

$$IB_r(nT)=Re\{S(nT)\}$$

$$QB_r(nT)=Im\{S(nT)\} \quad (2)$$

The in-phase component data string $IB_r(nT)$ is supplied to the first multiplier 304 and the delay unit 302. The delay unit 302 delays $IB_r(nT)$ by one symbol time length kT for output as a delayed in-phase component data string $IB_r(nT-kT)$ to the first multiplier 304 and the second multiplier 305. Here, k is the number of samplings per symbol.

The first multiplier 304 multiplies $IB_r(nT)$ by $IB_r(nT-kT)$, and then outputs the result as a delay detector in-phase component data string $DETI_r(nT)$ to the first low-pass filter 308. The second multiplier 305 multiplies $QB_r(nT)$ by $IB_r(nT-kT)$, and then outputs the result as a delay detector quadrature component data string $DETQ_r(nT)$ to the second low-pass filter 309. $DETI_r(nT)$ and $DETQ_r(nT)$ are expressed as the following Equation 3 and Equation 4, respectively.

$$DETI_r(nT) = IB_r(nT) \cdot IB_r(nT - kT) \quad (3)$$
$$= \frac{1}{2}\{S(nT) + \overline{S(nT)}\} \cdot \frac{1}{2}\{S(nT - kT) + \overline{S(nT - kT)}\}$$
$$= \frac{1}{4}\{\overline{S(nT)}S(nT - kT) + S(nT)\overline{S(nT - kT)} + S(nT)S(nT - kT) + \overline{S(nT)S(nT - kT)}\}$$

$$DETQ_r(nT) = IQ_r(nT) \cdot IQ_r(nT - kT) \quad (4)$$
$$= \frac{1}{2j}\{S(nT) - \overline{S(nT)}\} \cdot \frac{1}{2}\{S(nT - kT) + \overline{S(nT - kT)}\}$$
$$= \frac{1}{4j}\{S(nT)\overline{S(nT - kT)} - \overline{S(nT)}S(nT - kT) + S(nT)S(nT - kT) + \overline{S(nT)S(nT - kT)}\}$$

The first low-pass filter 308 eliminates a high-frequency component from $DETI_r(nT)$, and then outputs the result as $BI_r(nT)$ to the decision circuit (not shown). The second low-pass filter 309 eliminates a high-frequency component from $DETQ_r(nT)$, and then outputs the result as $BQ_r(nT)$ to the decision circuit (not shown). $BI_r(nT)$ and $BQ_r(nT)$ are expressed as the following Equation 5 and Equation 6, respectively.

$$BI_r(nT) = \frac{1}{4}\{\overline{S(nT)}S(nT - kT) + S(nT)\overline{S(nT - kT)}\} \quad (5)$$
$$= \frac{1}{2}\text{Re}\{S(nT)\overline{S(nT - kT)}\}$$

$$BQ_r(nT) = \frac{1}{4j}\{S(nT)\overline{S(nT - kT)} - \overline{S(nT)}S(nT - kT)\} \quad (6)$$
$$= \frac{1}{2}\text{Im}\{S(nT)\overline{S(nT - kT)}\}$$

Multiplication of S(nT) by S(nT–kT), which is a signal obtained by delaying S(nT) by one symbol time length, can be expressed by using a(nT) as the following Equation 7.

$$S(nT)\overline{S(nT-kT)} = a(nT)\overline{a(nT-kT)}\exp(j\cdot\omega\cdot kT) \quad (7)$$

Here, consider a case where the angular frequency ω of the center frequency of the partial band signal is selected so as to satisfy ω kT=2πz (where z is an integer; z=..., –1, 0, 1, ...). In other words, consider a case where the angular frequency ω is selected so as to satisfy the condition where the center frequency of the partial band signal is an integer multiple of the symbol frequency of the data to be received as ω=2πFb and kFs=1/T, where the center frequency of the partial signal is Fb and the symbol frequency is Fs. In this case, the term represented as exp always has a value of 1. Therefore, Equation 7 can be expressed as the following Equation 8.

$$S(nT)\overline{S(nT-kT)} = a(nT)\overline{a(nT-kT)} \quad (8)$$

Figure 29:
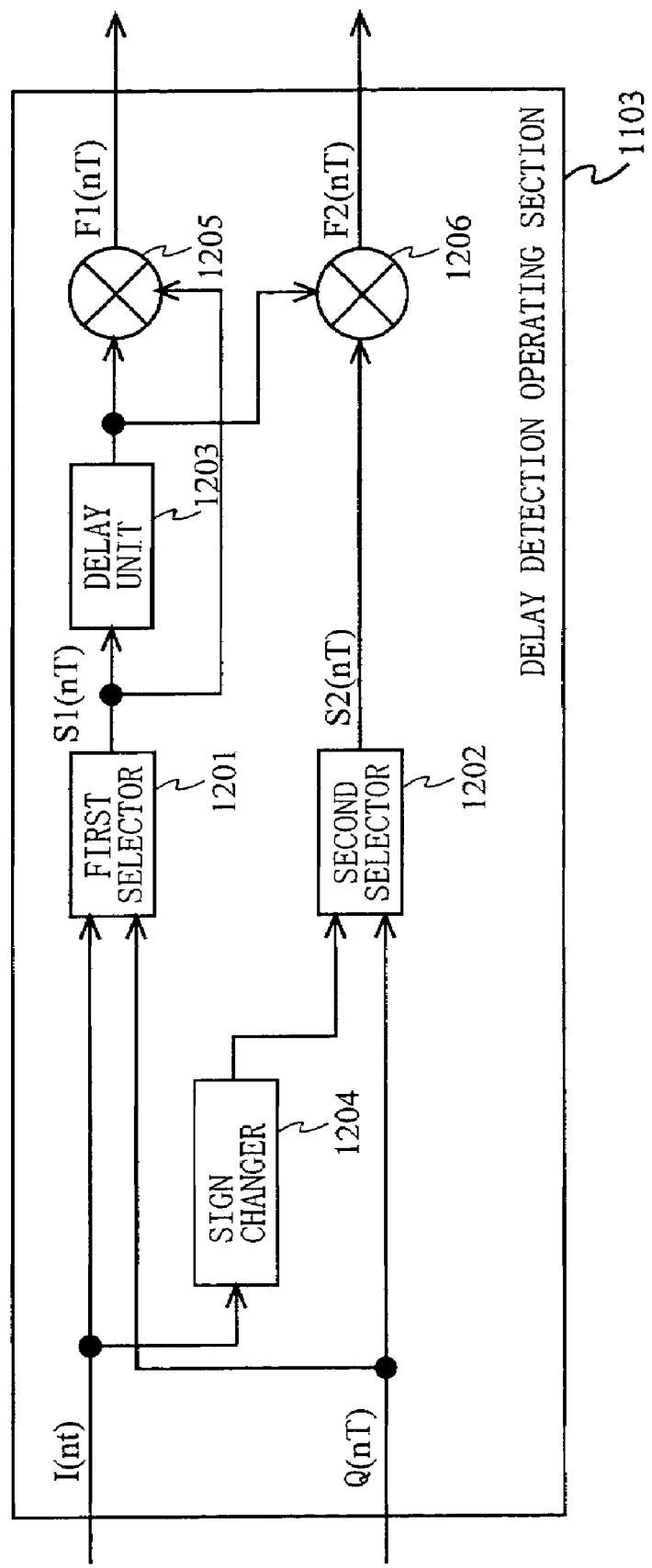
FIG. 29 is an illustration showing the structure of a delay detection operating section 1103.

Obviously, an operation expressed by Equation 8 is equivalent to a delay detection operation using a complex baseband signal. Therefore, the first delay detection operating section 103 does not require one sign changer and two selectors that have been conventionally required (refer to FIG. 29). Instead, as illustrated in FIG. 3, delay detection can be achieved with a simple structure by using only one delay unit, two multipliers, and two low-pass filters. The same goes for the second delay detection operating section 104.

As such, the data receiving device 1 according to the first embodiment of the present invention uses the partial band extracting section 102 to extract at least one partial band signal whose center frequency is not 0 from the complex baseband signal of the received modulated signal. By using the extracted signal, which is an intermediate-frequency signal, delay detection is performed. In a case where a plurality of partial bands are extracted, the data receiving device 1 uses the partial band extracting section 102 implemented by a complex filter to simultaneously extract partial band signals from a single complex baseband signal. That is, these partial band signals are extracted through digital processing. Therefore, it is possible to provide a data receiving device not requiring time for switching of the local oscillation signal or a plurality of analog circuits for extracting partial band signals.

Furthermore, signals other than those of the partial band(s) required by the partial band extracting section 102 are eliminated. Therefore, the data receiving device 1 can use the complex baseband signal without eliminating undesired signals, such as interference, that have been conventionally eliminated by using an analog circuit.

Still further, the partial band signal extracted by the partial band extracting section 102 is an intermediate-frequency signal including a phase rotation component. Therefore, the data receiving device can use the intermediate-frequency signal to perform a delay detecting operation.

Still further, ω is selected so that the center frequency of the partial band signal is an integral multiple of the symbol frequency of the data to be received. With this, unlike the conventional art, two selectors, and one sign changer are not required. Instead, one delay unit, two multipliers, and two low-pass filters suffice. Therefore, it is possible to provide a data receiving device with a reduced hardware size for LSI, thereby solving one of the problems in the conventional art.

Still further, the data receiving device 1 according to the first embodiment of the present invention does not perform a process of frequency-converting a high-frequency modulated signal to an intermediate-frequency signal and then directly sampling the intermediate-frequency signal by a sampler. Instead, the data receiving device 1 performs a process of quadrature-converting a high-frequency modulated signal to obtain a complex baseband signal and then extracting a partial band signal as an intermediate-frequency signal by eliminating undesired signals from the complex baseband signal. Therefore, in the data receiving device 1 according to the first embodiment of the present invention, at least a half of the band width of the high-frequency modulated signal is enough for a band width required for signal processing by the sampler. Therefore, the data receiving device of the present invention can be achieved with a less expensive sampler.

Figure 4:
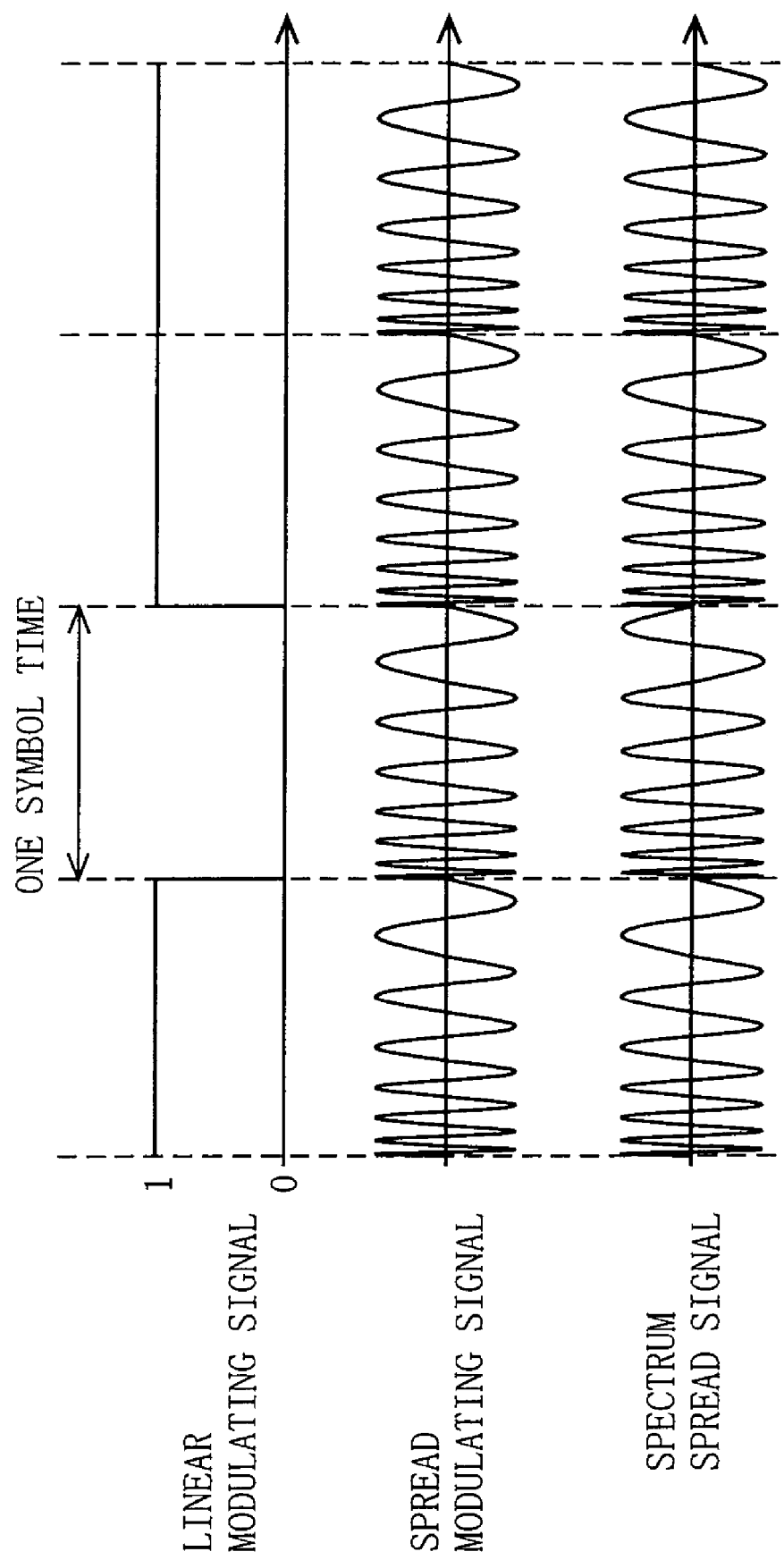
FIG. 4 is an illustration showing one example of a signal obtained through a spectrum spreading process by using a chirp signal as a spread modulating signal.

In the present embodiment, one example of the high-frequency modulated signal is a signal obtained through a spectrum spreading process on a phase-modulated signal by using, as a spread modulating signal, a chirp signal obtained through repeated sweeping of a sine-wave frequency at every predetermined period. FIG. 4 is an illustration showing one example of a signal obtained through a spectrum spreading process by using a chirp signal as a spread modulating signal.

In the present embodiment, the frequency converter circuit 105 frequency-converts the high-frequency modulated signal r(t) so that the resultant signal has a center frequency of 0. However, as long as the partial band extracting section 102 extracts a partial band signal whose center frequency is not 0, the frequency converter circuit 105 does not have to perform a frequency-converting process so that the resultant signal has a center frequency of 0.

In the present embodiment, the angular frequency ω of the center frequency of the partial band signal is selected so as to satisfy ω kT=2πz. Alternatively, the angular frequency ω can be selected so as to satisfy ω kT=(2z+1)π. In this case, a signal output from the first delay detection operating section 103 is a signal with the sign in Equation 8 being reversed. Therefore, by providing a sign changer to a stage subsequent to the first and second low-pass filters 308 and 309, it is possible to obtain the same results as those obtained by the circuit illustrated in FIG. 3.

Figure 5:
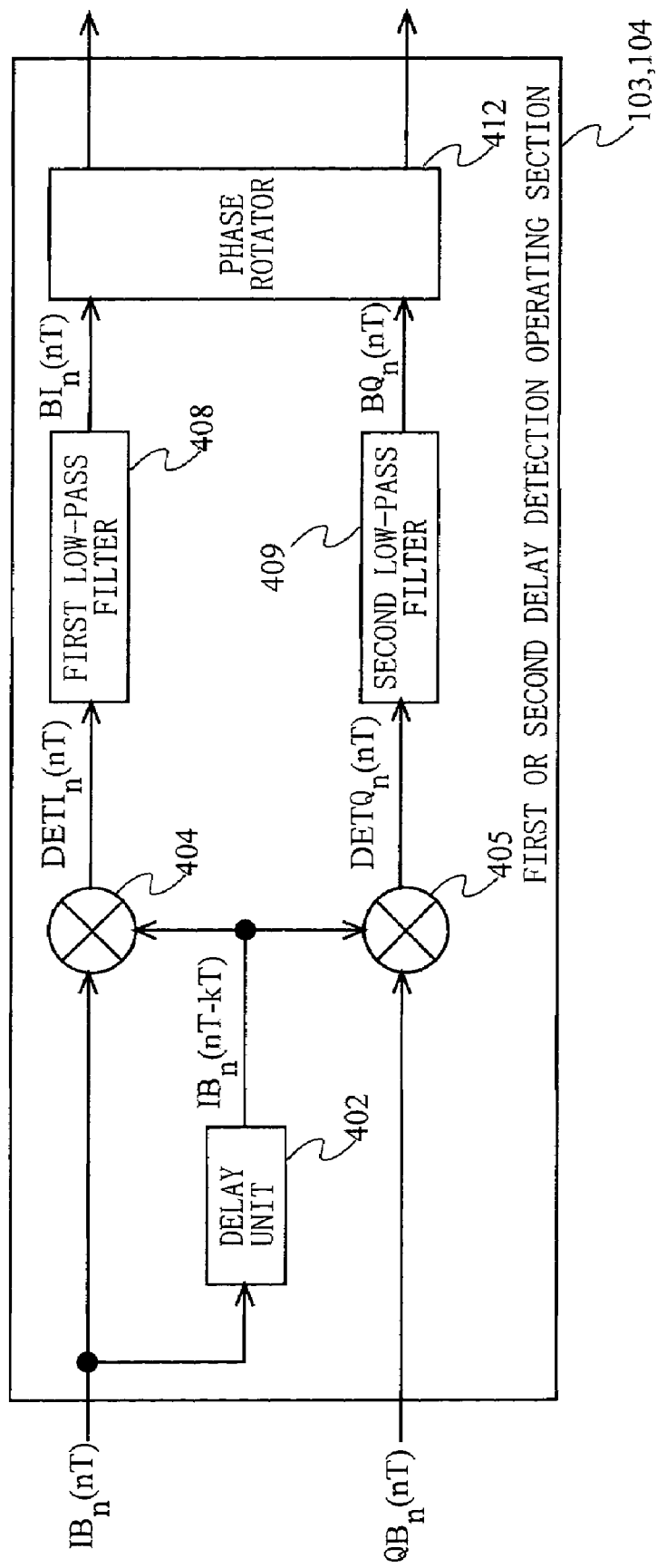
FIG. 5 is an illustration showing the structure of the first or second delay detection operating section 103 or 104 with a phase rotator being provided thereto.

The effects described above can be achieved even when ω kT is not equal to 2πz or (2z+1)π. FIG. 5 is an illustration showing the structure of the first or second delay detection operating section 103 or 104 with a phase rotator being provided thereto. In FIG. 5, the first or second delay detection operating section 103 or 104 includes a delay unit 402, a first multiplier 404, a second multiplier 405, a first low-pass filter 408, a second low-pass filter 409, and a phase rotator 412.

In the delay detection operating section 103 or 104, the operation until obtaining the delay unit in-phase component data string $DETI_r(nT)$ and the delay unit quadrature component data string $DETQ_r(nT)$ is the same as that performed by the delay detection operating section illustrated in FIG. 3. When ω kT is equal to 2πz, Equation 7 can be expressed as Equation 8. When ω kT is equal to (2z+1)π, Equation 7 can be expressed as an equation obtained by multiplying Equation 8 by −1 (an equation obtained by reversing the sign of Equation 8). In other cases, however, Equation 7 cannot be expressed in the above manner. Therefore, in order to enable Equation 7 to be expressed by using Equation 8, the phase rotator 412 multiples the signal expressed by Equation 7 by exp(−jω kT). With this multiplication by the phase rotator 412, it is possible to obtain the same effects equivalent to the delay detecting operation by using the complex baseband signal as illustrated in FIG. 3, even when ω kT is not equal to 2πz or (2z+1)π.

Figure 6:
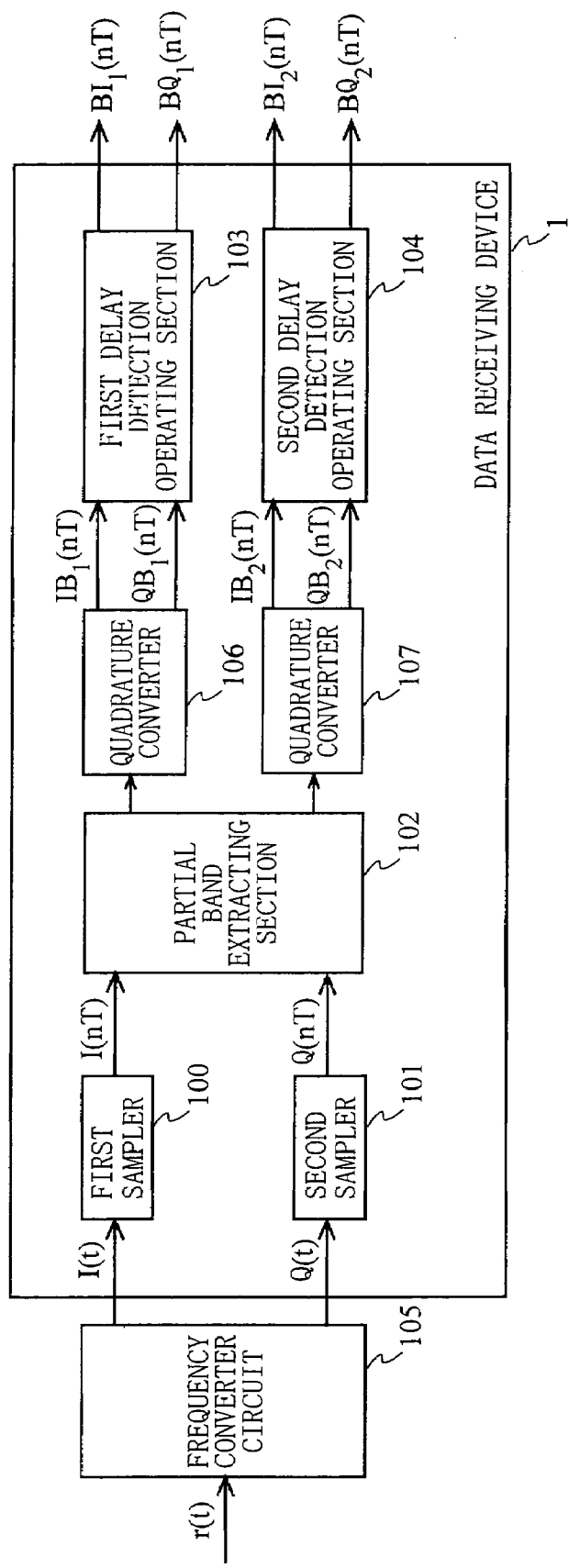
FIG. 6 is an illustration showing the configuration of the data receiving device with quadrature converters being provided thereto.

In the present embodiment, the partial band extracting section 102 outputs both of the in-phase component data string and the quadrature component data string. Alternatively, the partial band extracting section 102 may output either one of these strings. In this case, however, quadrature converters are required at the output side of the partial band extracting section 102. FIG. 6 is an illustration showing the configuration of the data receiving device 1 with quadrature converters being provided thereto. As illustrated in FIG. 6, quadrature converters 106 and 107 are provided at the output side of the partial band extracting section 102, quadrature-converting the in-phase component data string (or the quadrature component data string) output from the partial band extracting section 102 to output an in-phase component data string and a quadrature component data string to the first and second delay detection operating sections 103 and 104.

Second Embodiment

In the first embodiment, a high-frequency modulated signal including a plurality of partial band signals is supplied to the data receiving device. In a second embodiment, a data receiving device which is supplied with a single modulated signal is described.

Figure 7:
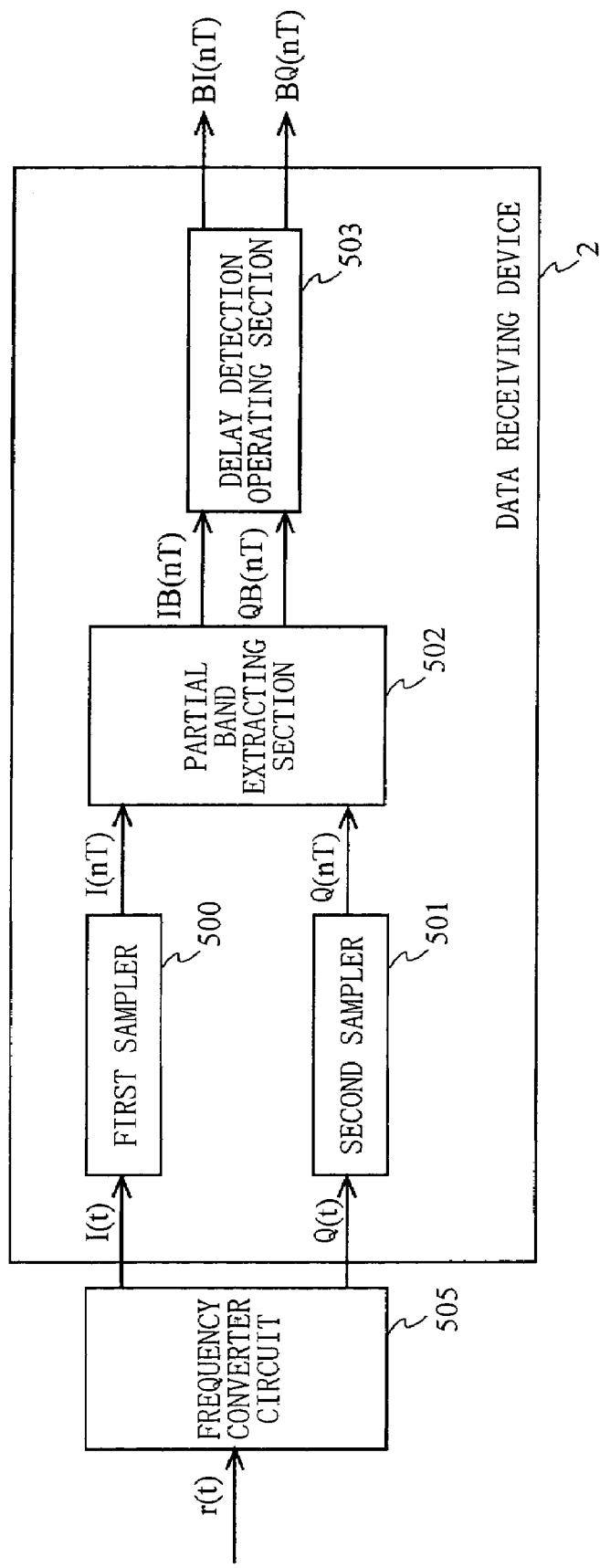
FIG. 7 is an illustration showing the configuration of a data receiving device 2 according to a second embodiment of the present invention.

FIG. 7 is an illustration showing the configuration of a data receiving device 2 according to the second embodiment of the present invention. In FIG. 7, the data receiving device 2 includes a first sampler 500, a second sampler 501, a partial band extracting section 502, and a delay detection operating section 503. The first sampler 500 and the second sampler 501 have connected prior thereto a frequency converter circuit 505. The delay detection operating section 503 has connected subsequent thereto a decision circuit (not shown).

The operations of the frequency converter circuit 505 and the data receiving device are described below. The first sampler 500 samples an in-phase component I(t) of a complex baseband signal output from the frequency converter circuit 505 to output an in-phase component data string I(nT) of the complex baseband signal. The second sampler 501 samples a quadrature component Q(t) of the complex baseband signal to output a quadrature component data string Q(nT) of the complex baseband signal.

Figure 8:
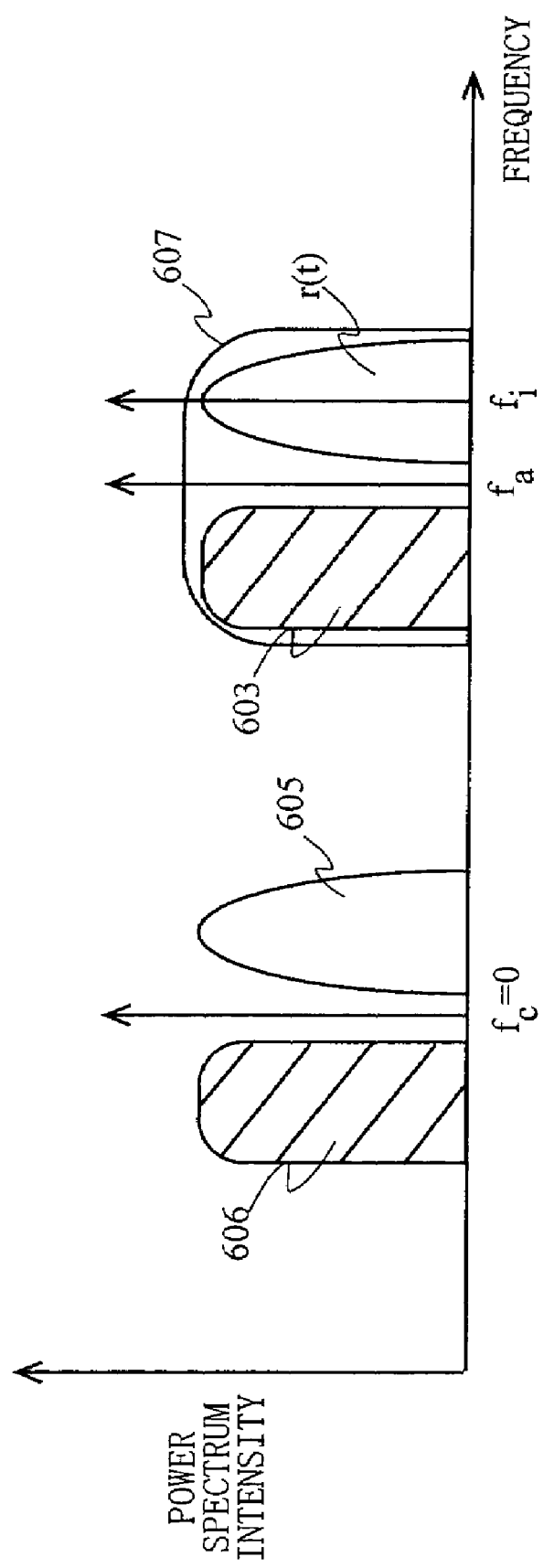
FIG. 8 is an illustration showing signal spectra for broadly describing how an in-phase component 1(t) and a quadrature component Q(t) of a complex baseband signal are obtained from a high-frequency signal supplied to a frequency converter circuit 505.

FIG. 8 is an illustration showing signal spectra for broadly describing how an in-phase component I(t) and a quadrature component Q(t) of a complex baseband signal are obtained from the high-frequency signal supplied to the frequency converter circuit 505. In FIG. 8, a received modulated signal r(t) is a high-frequency signal supplied to the frequency converter circuit 505. The center frequency of the received modulated signal r(t) is $f_i$. The frequency converter circuit 505 regards a signal within a band including the received modulated signal r(t) and an undesired signal as a virtual modulated signal 607. The frequency converter circuit 505 frequency-converts the virtual modulated signal 607 so that a reference frequency $f_a$ for frequency conversion of the virtual modulated signal 607 is converted to the center frequency $f_c$=0 of the complex baseband signal, quadrature-detects the frequency-converted virtual modulated signal 607, and then outputs a complex baseband signal.

With this frequency conversion, the received modulated signal r(t) is frequency-converted to a complex signal 605, and the undesired signal 603 is an undesired complex signal 606. Therefore, the complex baseband signal, which is an input signal of the first sampler 500 and the second sampler 501, becomes an analog signal with a spectrum of the complex signal 605 and a spectrum of the undesired complex signal 606 being mixed therein. For this reason, even with the use of a low-pass filter to perform a low-pass filtering process on the complex baseband signal, it is impossible to separate the complex signal 605 and the undesired complex signal 606.

In the data receiving device 2, the complex baseband signal including the complex signal 605 and the undesired complex signal 606 is a signal supplied to the first sampler 500 and the second sampler 501. The partial band extracting section 502 uses a complex filter to extract a partial band from the above complex baseband signal. Therefore, it is possible to separate and extract the complex signal 605 and the undesired complex signal 606. The partial band extracting section 502 extracts only the complex signal 605 having approximately the same band as that of the modulated signal to be received, and then outputs an in-phase component data string IB(nT) of a partial band signal, which is an in-phase component of the complex signal 605, and a quadrature component data string QB(nT) of the partial band signal, which is a quadrature component of the complex signal 605.

As illustrated in FIG. 8, this partial band signal is an intermediate-frequency signal whose center frequency is not 0. Therefore, as with the first embodiment, the delay detection operating section 503 having the same structure as that of the delay detection operating section in the first embodiment (FIG. 3) is used to output an in-phase component data string BI(nT) of a detection signal and a quadrature component data string BQ(nT) thereof.

As such, the data receiving device 2 according to the second embodiment of the present invention uses the partial band extracting section 502 structured by a complex filter to extract a complex baseband signal including a modulated signal in a partial band from a virtual modulated signal whose center frequency is not 0 obtained by frequency-converting the modulated signal. The extracted complex baseband signal does not include an undesired signal component. That is, the data receiving device 2 first extracts an intermediate-frequency signal including almost all frequency components of the modulated signal after frequency conversion to a low frequency band. Then, by using the extracted intermediate-frequency signal, the data receiving device 2 performs a delay detecting process to obtain a detection signal. Therefore, the data receiving device 2 according to the second embodiment can be used in a scheme for demodulating a phase-modulated signal other than the scheme described in the first embodiment for extracting at least one partial band component from frequency components of the received modulated signal to obtain a demodulated signal.

Furthermore, the data receiving device 2 according to the second embodiment can be applied to a case as described below. That is, the data receiving device 2 is supplied with a complex baseband signal including a plurality of modulated-wave signals of different band characteristics as an input signal. By using a complex filter, the data receiving device 2 simultaneously extracts these modulated-wave signals to obtain a detection signal. In this case, however, a decision circuit is required for each modulated-wave signal.

Still further, the spectrum of the modulated signal r(t) and the spectrum of the undesired signal 603 illustrated in FIG. 8 can be interchanged to obtain the same effects.

Still further, if the number of partial band signals to be extracted is increased, modulated signals as many as the increased number of partial band signals can be simultaneously detected.

Third Embodiment

The structure of the partial band extracting section 102 in the data receiving device 1 according to the first embodiment is described below in detail. First, a theory constituting grounds for the structure of the partial band extracting section 102 is described by using equations.

Now, it is assumed that two partial band signals to be extracted have center frequencies equally distanced apart from 0 by 1 MHz. Also, a transmission function of the complex filter for extracting the partial band complex signal 206 is represented as Hb(nT). In this case, the transmission function of the complex filter for extracting the partial band complex signal 206 illustrated in FIG. 2 is a complex conjugate of Hb(nT). As a result, S2(nT) representing the partial band complex signal 207 and S1(nT) representing the partial band complex signal 206 are expressed by the following Equation 9 and Equation 10, respectively.

$$\begin{aligned}S2(nT) &= S(nT)*Hb(nT) \\ &= \{\text{Re}(S(nT)) + j\,\text{Im}(S(nT))\} * \{\text{Re}(Hb(nT)) + j\,\text{Im}(Hb(nT))\} \\ &= \{\text{Re}(S(nT))*\text{Re}(Hb(nT)) - \text{Im}(S(nT))*\text{Im}(Hb(nT))\} + \\ & \quad j\{\text{Im}(S(nT))*\text{Re}(Hb(nT)) + \text{Re}(S(nT))*\text{Im}(Hb(nT))\}\end{aligned} \quad (9)$$

$$\begin{aligned}S1(nT) &= S(nT)*\overline{Hb(nT)} \\ &= \{\text{Re}(S(nT)) + j\,\text{Im}(S(nT))\} * \{\text{Re}(Hb(nT)) + j\,\text{Im}(Hb(nT))\} \\ &= \{\text{Re}(S(nT))*\text{Re}(Hb(nT)) + \text{Im}(S(nT))*\text{Im}(Hb(nT))\} + \\ & \quad j\{\text{Im}(S(nT))*\text{Re}(Hb(nT)) - \text{Re}(S(nT))*\text{Im}(Hb(nT))\}\end{aligned} \quad (10)$$

In Equation 9 and Equation 10, * represents a convolutional integration operation, and j is an imaginary unit.

As can be seen from Equation 9 and Equation 10, in-phase components S2(nT) and S1(nT) are expressed as Re(S(nT))*Re(Hb(nT)) and Im(S(nT))*Im(Hb(nT)), respectively, and quadrature components thereof are expressed as Im(S(nT))*Re(Hb(nT)) and Re(S(nT))*Im(Hb(nT)), respectively. With the use of this mathematical theory, the partial band extracting section 102 in the first embodiment can be easily achieved. The structure of the partial band extracting section 102 is now specifically described below.

Figure 9:
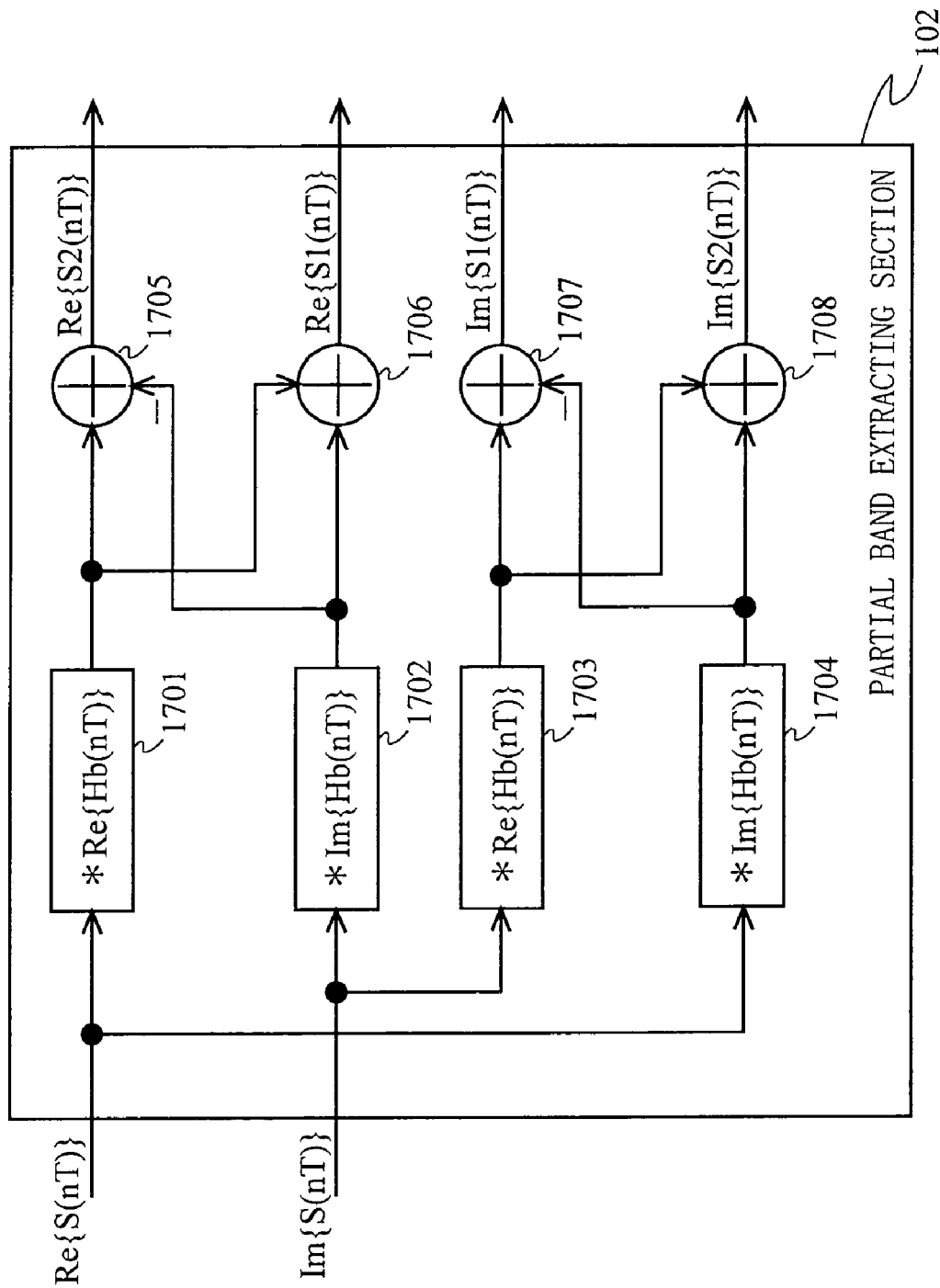
FIG. 9 is an illustration showing the structure of a partial band extracting section according to a third embodiment.

FIG. 9 is an illustration showing the structure of a partial band extracting section according to a third embodiment. The partial band extracting section 102 illustrated in FIG. 9 uses the results from the mathematical theory expressed by Equation 9 and Equation 10. In FIG. 9, the partial band extracting section 102 includes a first filtering unit 1701, a second filtering unit 1702, a third filtering unit 1703, a fourth filtering unit 1704, a first subtractor 1705, a second subtractor 1707, a first adder 1706, and a second adder 1708.

In FIG. 9, with an input signal Re{S(nT)} corresponding to I(nT) and an input signal Im{S(nT)} corresponding to Q(nT), it is possible to achieve the partial band extracting section 102 according to the first embodiment.

The first filtering unit 1701 performs a convolutional integration operation of Re(S(nT))*Re(Hb(nT)). Similarly, the second filtering unit 1702 performs an operation of Im(S(nT))*Im(Hb(nT)). The third filtering unit 1703 performs an operation of Im(S(nT))*Re(Hb(nT)). The filtering unit 1704 performs an operation of Re(S(nT))*Im(Hb(nT)).

The first subtractor 1705 performs an operation of Re(S(nT))*Re(Hb(nT))−Im(S(nT))*Im(Hb(nT)) to output the in-phase component of the partial band complex signal S2(nT).

The second adder 1708 performs an operation of Im(S(nT))*Re(Hb(nT))+Re(S(nT))*Im(Hb(nT)) to output the quadrature component of the partial band complex signal S2(nT).

Also, the first adder 1706 performs an operation of Re(S(nT))*Re(Hb(nT))+Im(S(nT))*Im(Hb(nT)) to output the in-phase component of the partial band complex signal S1(nT). The second subtractor 1707 performs an operation of Im(S(nT))*Re(Hb(nT))−Re(S(nT))*Im(Hb(nT)) to output the quadrature of the partial band complex signal S1(nT).

With this, the partial band extracting section 102 outputs $IB_1(nT)$ as an output signal $Im\{S_1(nT)\}$, $QB_1(nT)$ as $Re\{S_1(nT)\}$, $IB_2(nT)$ as $Im\{S_2(nT)\}$, and $QB_2(nT)$ as $Re\{S_2(nT)\}$ (refer to FIG. 1).

As such, in the third embodiment, as expressed in Equation 9 and Equation 10, the filtering unit having common tap coefficients is shared. Therefore, the structure of the partial band extracting section 102 can be simplified.

In the present embodiment, two partial band signals are extracted. The partial band extracting section can also be applied to a case where three or more partial band signals are extracted. Specifically, the filtering unit having common tap coefficients is shared to structure the partial band extracting section.

Fourth Embodiment

In the partial band extracting section 102 illustrated in FIG. 9, a pair of the filtering units 1701 and 1703 having the same structure and another pair of the filtering units 1702 and 1704 having the same structure are required. In a fourth embodiment, a partial band extracting section in which redundant filtering units are formed as one filtering unit is described.

Figure 10:
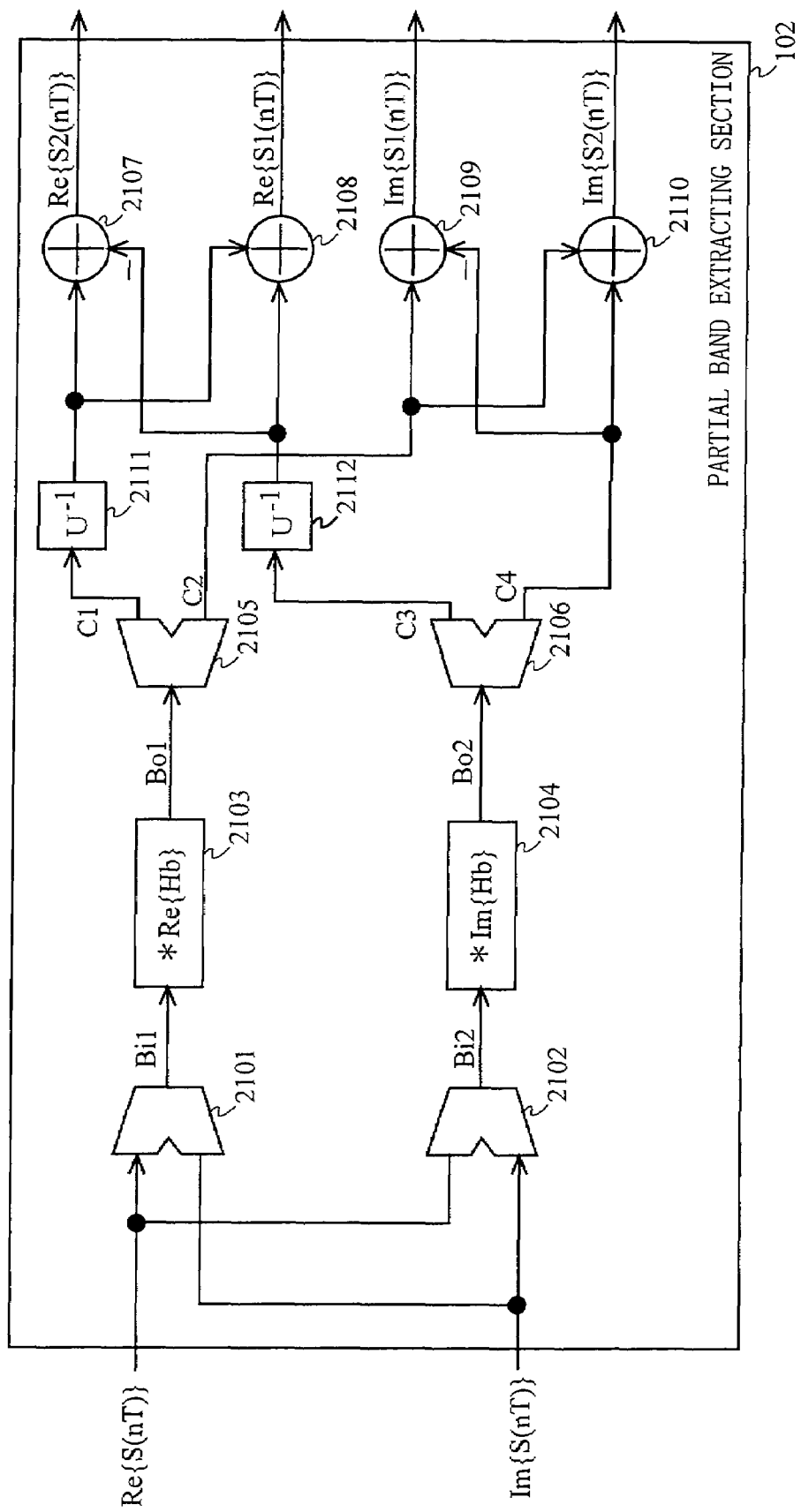
FIG. 10 is an illustration showing the structure of a partial band extracting section according to a fourth embodiment.

FIG. 10 is an illustration showing the structure of a partial band extracting section according to the fourth embodiment. In FIG. 10, the partial band extracting section 102 includes a first input selector 2101, a second input selector 2102, a first filtering unit 2103, a second filtering unit 2104, a first output selector 2105, a second output selector 2106, a first subtractor 2107, a second subtractor 2109, a first adder 2108, a second adder 2110, a first delay unit 2111, and a second delay unit 2112.

The operation of the partial band extracting section 102 illustrated in FIG. 10 is described below.

Figure 11:
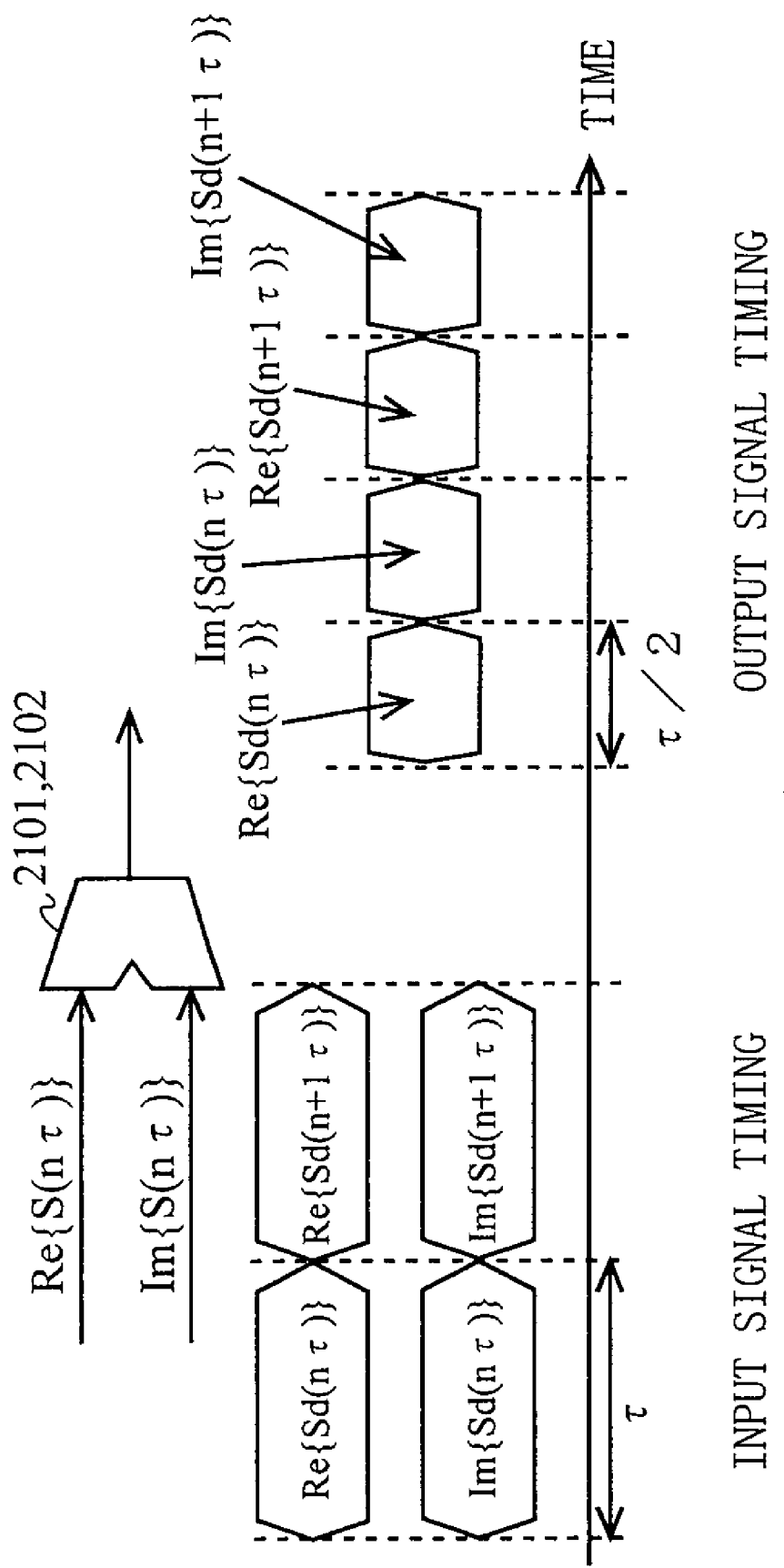
FIG. 11 is a timing chart showing the operation of a first input selector 2101 or a second input selector 2102.

The first input selector 2101 and the second input selector 2102 each alternately select, at every period τ/2, two input signals whose values are varied at every period τ, and outputs the selected signal. FIG. 11 is a timing chart showing the operation of the first input selector 2101 or the second input selector 2102.

The first filtering unit 2103, which is connected subsequent to the first input selector 2101, performs a convolutional integration operation on a signal supplied at every period τ/2. The second filtering unit 2104 performs a convolutional integration operation on a signal supplied at every period τ/2.

The first output selector 2105 and the second output selector 2106 each output, from two different output terminal provided thereto, a signal whose value is varied at every period τ/2. This output operation is performed in synchronization with a time when the signal value is varied. FIG. 12 is a timing chart showing the operation of the first output selector 2105 or the second output selector 2106.

FIG. 13 is a timing chart showing signals output from the first input selector 2101 and the second input selector 2102. As can be seen from FIGS. 11 and 12, when the first input selector 2101 and second input selector 2102 are supplied with a signal Re{S(nT)} and a signal Im{S(nT)} which are varied at every period T, a signal Bi1 output from the first input selector 2101 and a signal Bi2 output from the second input selector 2102 are varied with time as illustrated in FIG. 13, where it is assumed that τ is equal to T.

FIG. 14 a timing chart showing signals output from the first output selector 2105 and the second output selector 2106. The first filtering unit 2103 and the second filtering unit 2104 each perform a convolutional integration operation at every period T/2. Therefore, signals C1 and C2 output from the first output selector 2105 and signals C3 and C4 output from the second output selector 2106 are varied with time as illustrated in FIG. 14.

The above outputs C1 through C4 are specifically described below, assuming that no signal processing delay occurs. For example, when Bi1 is Re{S(nT)}, Bi2 is Im{S(nT)}. At this time, C1(nT) becomes Re{S(nT)}*Re{Hb} during one period. C2(nT) becomes Im{S((n−1)T)}*Re{Hb} during the first half of this period, and becomes Im(S(nT))*Re{Hb} during the latter half thereof. C3(nT) becomes Im{S(nT)}*Im{Hb} during this period. C4(nT) becomes Re{S((n−1)T}*Im{Hb} during the first half of this period, and becomes Re{S(nT)}*Im{Hb} during the latter half thereof.

The first delay unit 2111 delays the signal C1 by a time U=T/2. The second delay unit 2112 delays the signal C3 by a time U=T/2. Therefore, a time when the signal is supplied to the first subtractor 2107 is approximately equal to a time when the signal is supplied to the first adder 2108. Also, a time when the signal is supplied to the second subtractor 2109 is approximately equal to a time when the signal is supplied to the second adder 2110.

Therefore, as evident from the above specific example and Equations 9 and 10, the first adder 2108 outputs the in-phase component of the partial band complex signal S1(nT). The second subtractor 2109 outputs the quadrature component of the partial band complex signal S1(nT). The first subtractor 2107 outputs the in-phase component of the partial band complex signal S2(nT). The second adder 2110 outputs the quadrature component of the partial band complex signal S2(nT).

As expressed in Equation 9 and Equation 10, if partial band complex signals equally distanced apart from a frequency of 0 are taken as a pair, tap coefficients of the complex filter for extracting the pair of the partial band complex signals can be made so as to have a complex conjugate relation with each other. Therefore, as with the partial band extracting section according to the fourth embodiment, it is possible to share a filtering unit for extracting the partial bands.

In the above specific example, the number of partial bands to be extracted is two. If an even number of four or more of partial bands are to be extracted, two partial bands whose center frequencies are equally distanced apart from the frequency of 0 are taken as a pair. For that pair, a tap coefficient can be shared.

In the present embodiment, the input selectors 2101 and 2102 each alternately select the in-phase component and then the quadrature component at every T/2. However, the selection order is not restricted to the above, and can be vice versa. That is, the quadrature component is first selected, and then the in-phase component is selected. In this case, the first delay unit 2111 is connected to the first output selector 2105 at the output terminal for outputting C2, while the second delay unit 2112 is connected to the second output selector 2106 at the output terminal for outputting C4.

Fifth Embodiment

Figure 15:
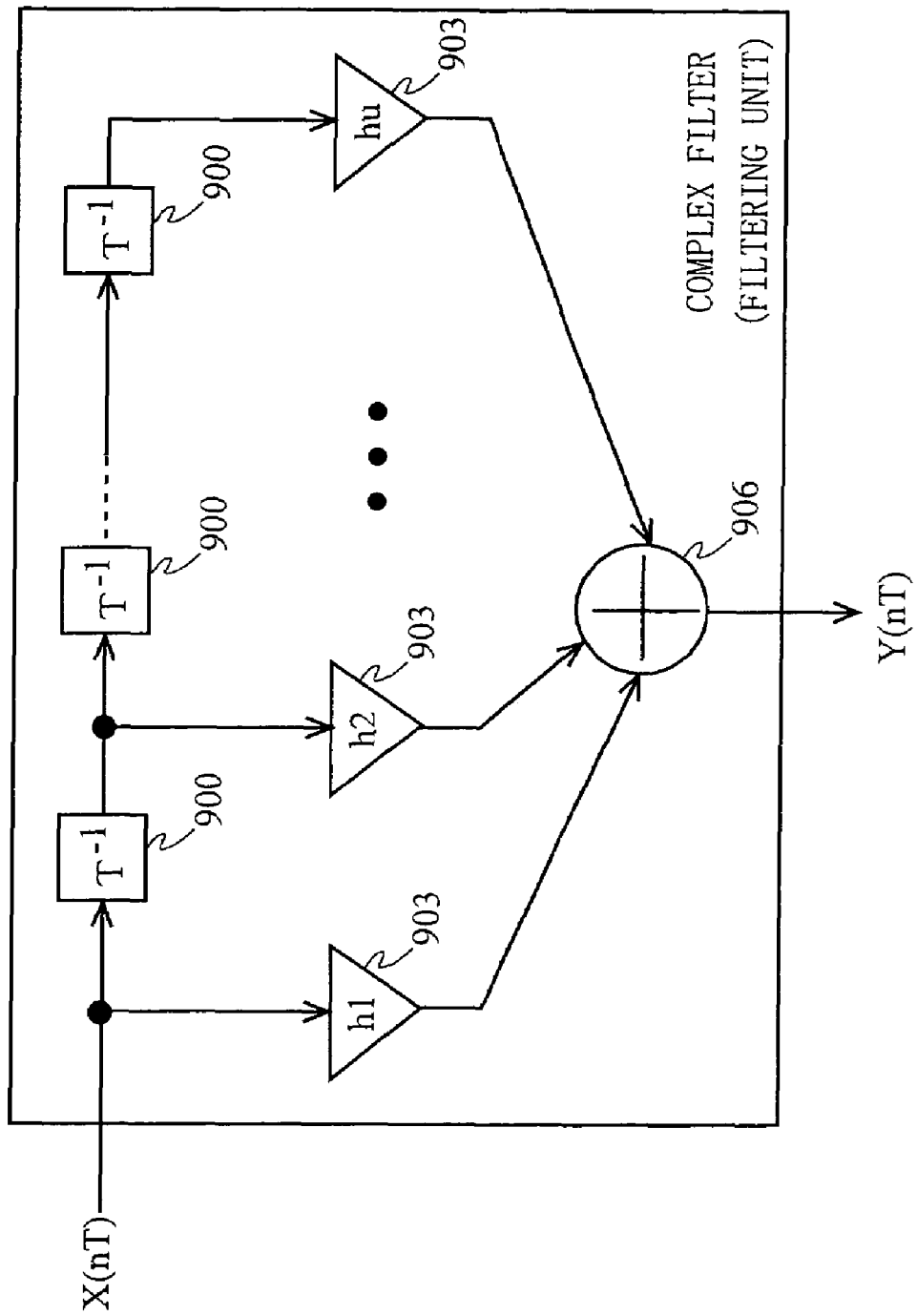
FIG. 15 is an illustration showing a general structure of a complex filter used for a filtering unit in a partial band extracting section according to the third and fourth embodiments.

FIG. 15 is an illustration showing a general structure of the complex filter used for a filtering unit in the partial band extracting section according to the third and fourth embodiments. FIG. 15 illustrates a case where a FIR (Finite Impulse Response) filter is used as the complex filter. In a fifth embodiment, a method of simplifying the structure of the FIR filter is described.

Figure 16:
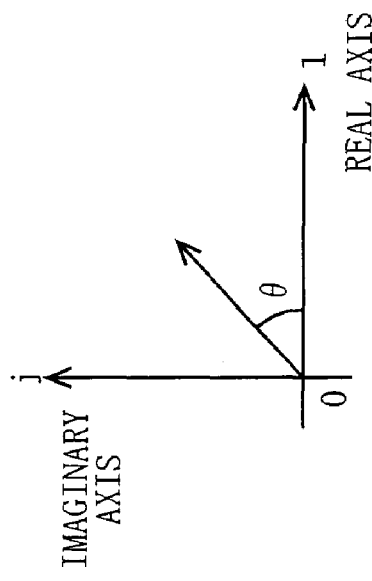
FIG. 16 is an illustration showing a complex plane for describing a tap coefficient of the complex filter.
Figure 17:
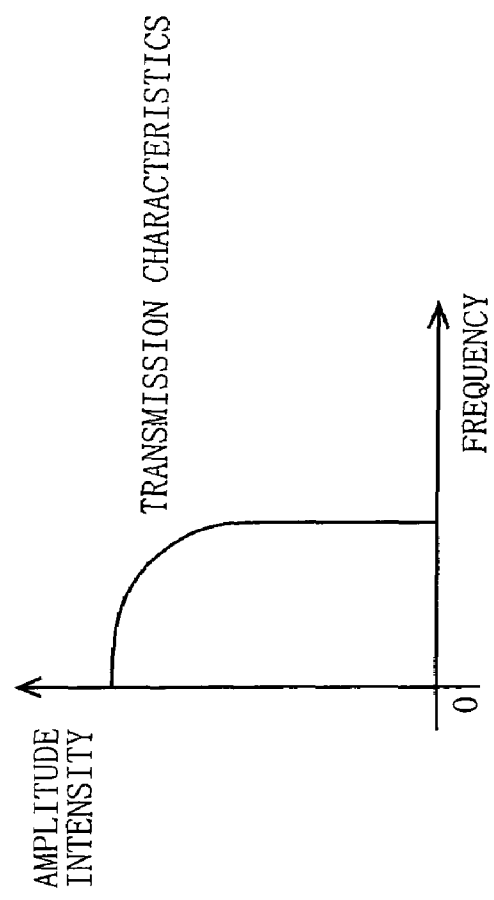
FIG. 17 is an illustration broadly showing transmission band characteristics in a baseband of the complex filter used in the partial band extracting section.

FIG. 16 is an illustration showing a complex plane for describing a tap coefficient of the complex filter. FIG. 17 is an illustration broadly showing transmission band characteristics in a baseband of the complex filter used in the partial band extracting section.

In FIG. 15, the FIR filter includes (u-1) delay units 900, u tap coefficient multipliers 903, and an adder 906, where u is an integer of two or more. In the drawing, h1, h2, ..., hu each represent a complex tap coefficient value of each tap coefficient multiplier 903. X(nT) is a complex signal data string. Y(nT) is a complex signal data string after wave shaping.

In order to extract a partial band signal having a center frequency of Fb by using the low-pass filter having the transmission characteristics illustrated in FIG. 17, each tap coefficient of the filter has to be multiplied by a phase rotation component in advance. Now assuming that the symbol frequency of the transmission data is Fs, a phase rotation component θ by which a tap coefficient hd (where d=1, 2, 3, ..., u) is to be multiplied is expressed by the following Equation 11.

$$\theta = 2\pi \frac{F_b}{kF_s} \quad (11)$$

As described in the first embodiment the delay detection operating sections 103 and 104 can be easily achieved if the angular frequency ω of the center frequency of the partial band signal is selected so that the relation between the angular frequency ω and the sampling period T holds ω kT=2πz (where z is an integer; z=..., -1, 0, 1, ...), that is, so that the center frequency of the partial band signal has a value of an integer multiple of the symbol frequency of the data to be transmitted.

In addition, if ω is selected so as to also satisfy the relation expressed in the following Equation 12, not only the delay detection operating sections 103 and 104 but also the filtering unit (complex filter) used in the partial band extracting section 102 can be easily achieved.

$$\frac{z}{k} = \frac{1}{8\alpha} \quad (\alpha = 1, 2, 3, \cdots) \quad (12)$$

The reason for the above is as follows. That is, if the relation between k and z can be as in Equation 12, a collection of the phase rotation component θ by which the tap coefficient hd can be multiplied includes 0 rad, π/2 rad, πrad, and 3π/2 rad, which cause either one of the in-phase component and the quadrature component to be 0, and also includes π/4 rad, 3π/4 rad, 5π/4 rad, and 7π/4 rad, which cause absolute values of the in-phase component and the quadrature component to be equal to each other.

First, consider the fact that the phase rotation components θ include 0 rad, π/2 rad, πrad, and 3π/2 rad. When the phase rotation components θ by which the tap coefficient hd is multiplied are 0 rad, π/2 rad, πrad, and 3π/2 rad, the in-phase component or the quadrature component of the tap coefficient after multiplication becomes 0. Therefore, the number of tap coefficient multipliers 903 can be reduced.

Next, consider the fact that the phase rotation components θ include π/4 rad, 3π/4 rad, 5π/4 rad, and 7π/4 rad. When the phase rotation components θ by which the tap coefficient hd is multiplied are π/4 rad, 3π/4 rad, 5π/4 rad, and 7π/4 rad, the absolute values of the in-phase component and the quadrature component of the tap coefficient after multiplication become equal to each other. Therefore, the number of tap coefficient multipliers 903 can be reduced.

Figure 18:
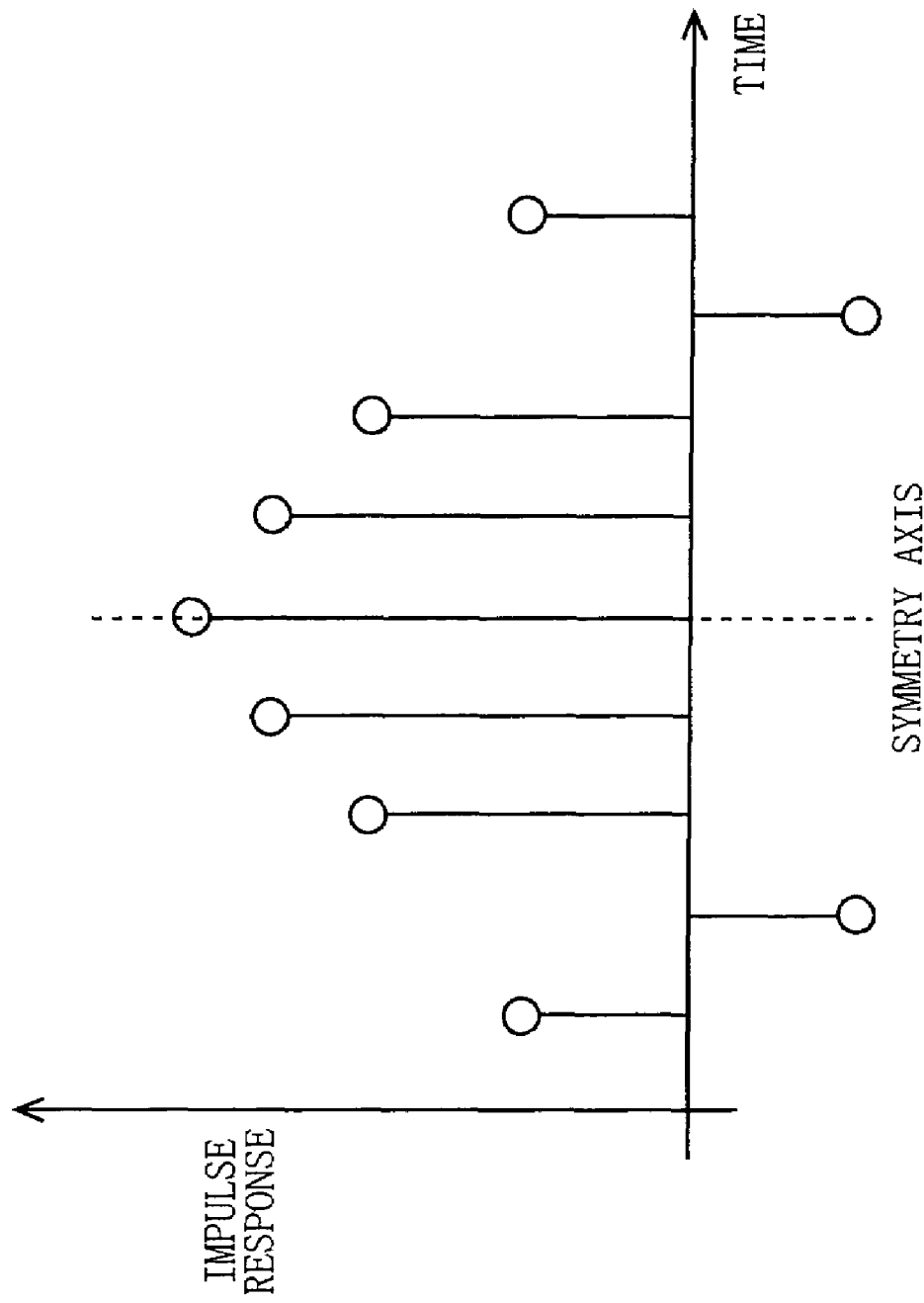
FIG. 18 is an illustration showing an impulse response waveform of the complex filter.

The above descriptions are further described by using equations. FIG. 18 is an illustration showing an impulse response waveform of the complex filter. For example, if the low-pass filter used as the complex filter in a baseband is an FIR filter having twenty (u=20) taps and an impulse response waveform of the complex filter is a symmetric wave as illustrated in FIG. 18, a transmission function HL(nT) can be generally expressed as the following Equation 13 by using z transform.

$$HL(nT) = h_0 Z^0 + h_1 Z^1 + h_2 Z^{-2} + \cdots + h_{19} Z^{-19} + h_{20} Z^{-20} \quad (13)$$

$$= h_0 (Z^0 + Z^{-20}) + h_1 (Z^{-1} + Z^{-19}) + \cdots + h_9 (Z^{-9} + Z^{-11}) + h_{10}$$

Figure 19:
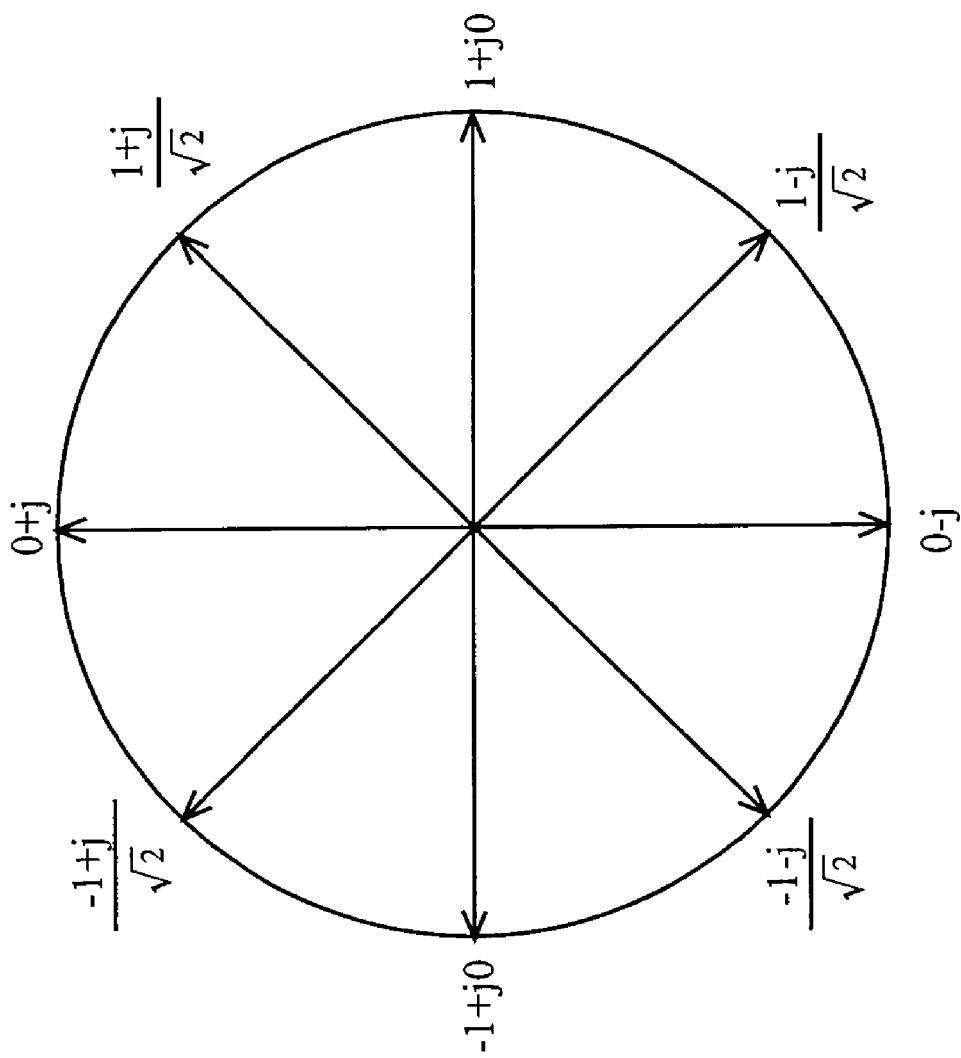
FIG. 19 is an illustration showing, on a complex plane, a collection of phase rotation components θ by which each tap coefficient satisfying a relation of Equation 12 is multiplied.

FIG. 19 is an illustration showing, on a complex plane, a collection of the phase rotation components θ by which each tap coefficient satisfying the relation of Equation 12 is multiplied. In FIG. 19, when a tap coefficient h10 is multiplied by a phase rotation component θ=1+j0 and each tap coefficient hd is multiplied by the phase rotation component θ so that the partial band complex signal S2(nT) is extracted, Equation 13 becomes as the following Equation 14 and Equation 15 representing the in-phase component and the quadrature component, respectively.

$$\text{Re}\{Hb(nT)\} = \frac{h_1}{\sqrt{2}}(Z^{-1} + Z^{-19}) + h_2(Z^{-2} + Z^{-18}) + \frac{h_3}{\sqrt{2}}(Z^{-3} + Z^{-17}) - \frac{h_5}{\sqrt{2}}(Z^{-5} + Z^{-15}) - \quad (14)$$

$$h_6(Z^{-6} + Z^{-14}) - \frac{h_7}{\sqrt{2}}(Z^{-7} + Z^{-13}) + \frac{h_9}{\sqrt{2}}(Z^{-9} + Z^{-11}) + h_{10}$$

$$\text{Im}\{Hb(nT)\} = -h_0(Z^{-0} - Z^{-20}) - \frac{h_1}{\sqrt{2}}(Z^{-1} + Z^{-19}) + \frac{h_3}{\sqrt{2}}(Z^{-3} - Z^{-17}) + h_4(Z^{-4} - Z^{-16}) + \quad (15)$$

$$\frac{h_5}{\sqrt{2}}(Z^{-5} - Z^{-15}) - \frac{h_7}{\sqrt{2}}(Z^{-7} - Z^{-13}) - h_8(Z^{-8} - Z^{-12}) - \frac{h_9}{\sqrt{2}}(Z^{-9} - Z^{-11})$$

Here, Hb(nT) is one example of a transmission function Hb(nT) of the complex filter shown in Equations 9 and 10. Also, Re{Hb(nT)} in Equation 14 represents the in-phase component of the transmission function, while Im{Hb(nT)} in Equation 15 represents the quadrature component of the transmission function.

As can be seen from Equation 14, terms of h4 and h8 are not included. This is because these coefficients become 0 as a result of multiplication by π/2 rad and 3π/2 rad as the phase rotation components θ. Furthermore, as can be seen from Equation 15, terms of h2, h6, and h10 are not included. This is because these coefficients become 0 as a result of multiplication by 0 rad and πrad as the phase rotation components θ. Still further, as can be seen from the values of the tap coefficients excluding their signs in Equations 14 and 15, five coefficients including h1, h3, h5, h7, and h9 are common between the in-phase component and the quadrature component of the transmission function Hb(nT). This is due to the fact that the phase rotation components θ are arranged so as to include values of integer multiples of π/4 when the relation as shown in Equation 12 is satisfied.

As such, the number of taps of the complex filter forming the partial band extracting section can be reduced with ω kT=2πz (where z is an integer; z=..., −1, 0, 1, ...). That is, the number of taps can be reduced by setting a value of the center frequency of the partial band to be extracted as an integer multiple of the symbol frequency and by setting the number of samplings within one symbol period as a value obtained by dividing the center frequency of the partial band signal to be extracted by a symbol frequency and then multiplying the division result by 8. Therefore, the partial band extracting section of the fourth and fifth embodiments can be achieved with more simplified structure.

Here, the tap coefficients of the complex filter for extracting a pair of partial bands have a complex conjugate relation. Therefore, when a plurality of partial bands are extracted, an even number of partial bands equally distanced from a frequency of 0 are extracted as pairs. With this, in addition to the above effects, another effect can be achieved in which the tap coefficients can be shared even among the filters for extracting the partial bands.

Specific Descriptions of Effects

The above-described effects are specifically described below by taking a case where the partial band extracting section 102 according to the first or second embodiment extracts two partial bands.

Now, it is assumed that the number of samplings per symbol k is set as 16, the symbol frequency Fs of the transmission signal is set as 0.5 MHz, and the two partial bands to be extracted are set so as to have center frequencies equally distanced apart from a frequency of 0 by 1 MHz. That is, it is assumed that kT=1/Fs=2 MHz and Fb=1 MHz or −1 MHz. From Equation 11, the phase rotation component θ by which the tap coefficient hd (where d=0, 1, 2, ..., u) to be multiplied is π/4 rad. Also, from Fb/Fs=z, α is 1. Therefore, the above setting satisfies two conditions, that is, ω kT=2πz (z is an integer) and Equation 12.

The value of π/4 rad obtained from Equation 11 means that the phase rotation component θ advances at every sampling frequency T one by one to eight values on the complex plane of FIG. 19 in a clockwise or counterclockwise direction. As can be seen from FIG. 19, the phase rotation component θ can take values of 0 rad, π/2 rad, πrad, and 3π/2 rad. Therefore, in the phase rotation component, the in-phase component or the quadrature component of the tap coefficient becomes 0, thereby reducing the number of tap coefficient multipliers. Furthermore, the phase rotation component θ can take values of π/4 rad, 3π/4 rad, 5π/4 rad, and 7π/4 rad. Therefore, in the phase rotation component, absolute values of the in-phase component and the quadrature component become equal to each other. This enables the tap coefficient multipliers to be shared, thereby reducing the number of tap coefficient multipliers.

Therefore, if ω is selected so as to satisfy ω kT=2πz (where z is an integer; z=..., −1, 0, 1, ...) and the relation expressed in Equation 12, the number of tap coefficient multipliers can be reduced. Thus, not only the delay detection operating section but also the partial band extracting section can be easily achieved.

Sixth Embodiment

Figure 20:
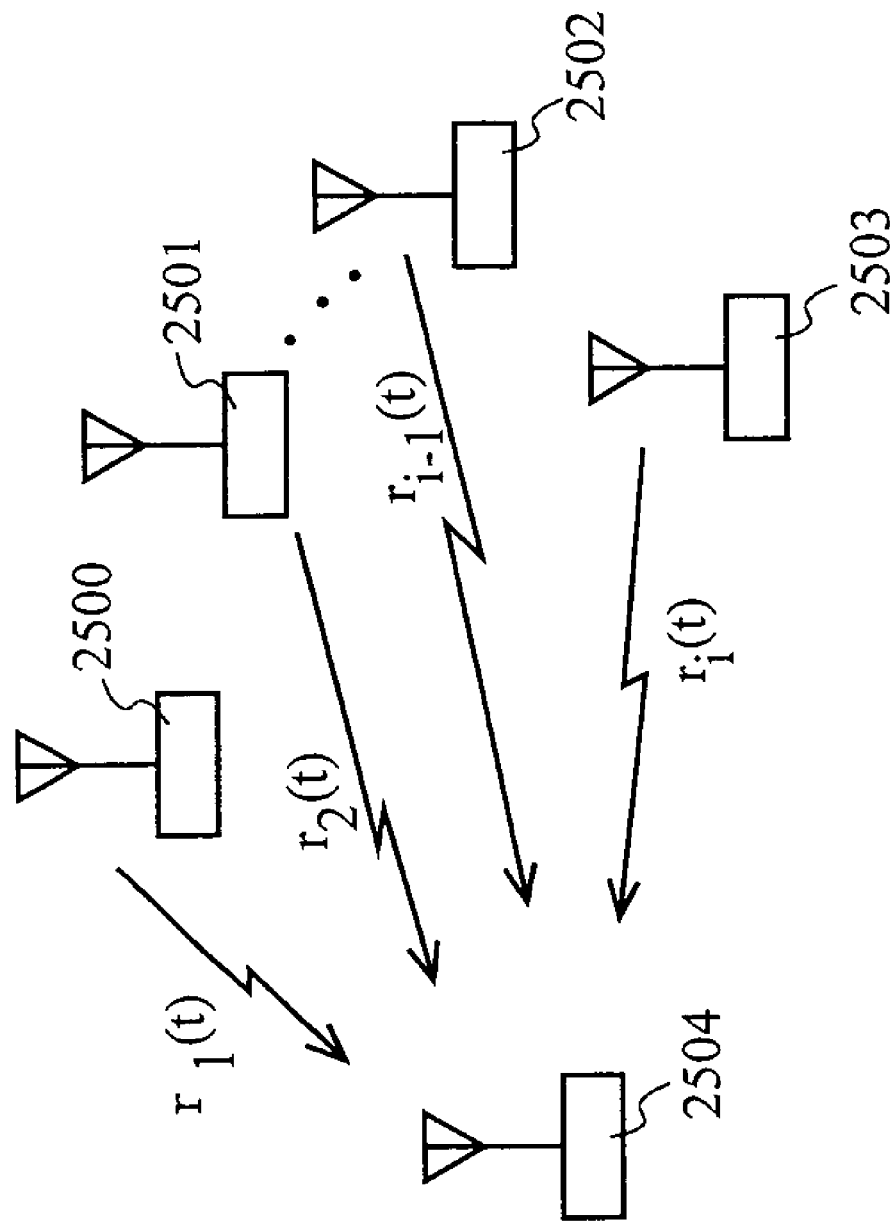
FIG. 20 is a general illustration showing a wireless communications system using the data receiving device according to any one of the above embodiments of the present invention.

FIG. 20 is a general illustration showing a wireless communications system using the data receiving device according to any one of the above embodiments of the present invention. In FIG. 20, the wireless communications system includes i (i is a positive integer) base stations (a first base station 2500, a second base station 2501, ..., an (i−1)-th base station 2502, and an i-th base station 2503) and a mobile station 2504. The mobile station 2504 is a wireless communications device using the data receiving device according to any one of the above embodiments of the present invention. For convenience in description, it is assumed herein that, as the data receiving device, the mobile station 2504 uses the data receiving device 1 according to the first embodiment. However, this is not meant to be restrictive, and the data receiving device according to any other embodiments can be used. Also, a plurality of said mobile stations can be provided. The operation of the wireless communications system illustrated in FIG. 20 is described below with reference to FIGS. 1 and 21.

Figure 21:
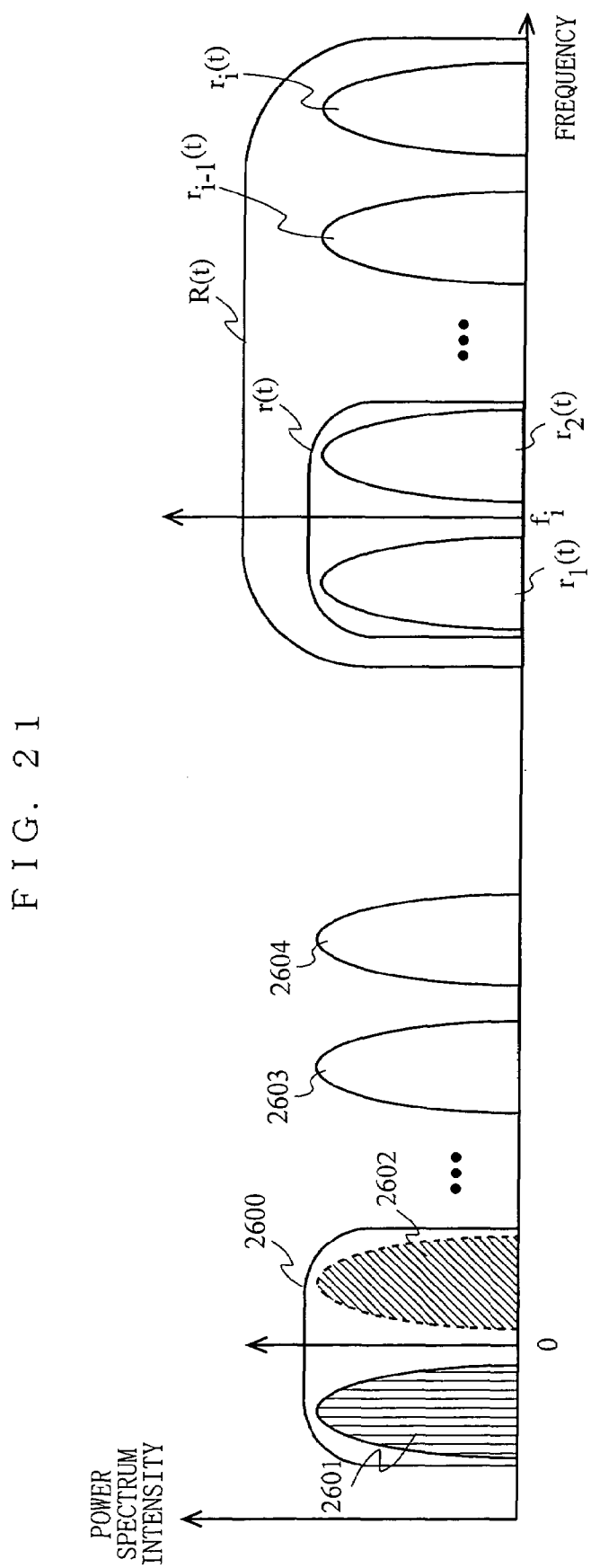
FIG. 21 is an illustration generally showing spectra of a high-frequency modulated signal for use in the wireless communications system illustrated in FIG. 20.
Figure 22:
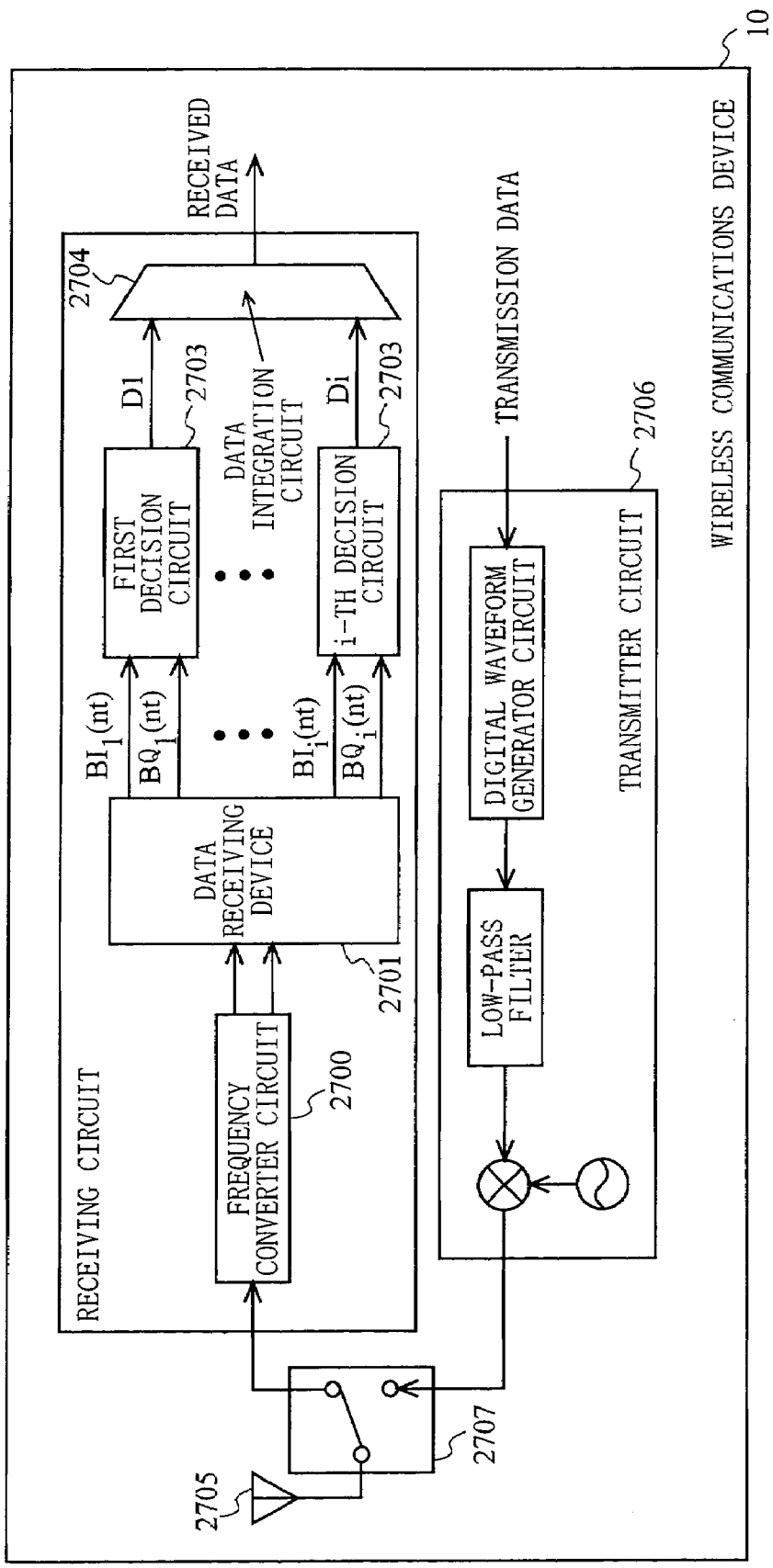
FIG. 22 is a block diagram illustrating an example of a structure of a wireless communications device 10 according to a seventh embodiment of the present invention, the communications device using the data receiving device according to any one of the embodiments of the present invention.

FIG. 21 is an illustration generally showing spectra of a high-frequency modulated signal for use in the wireless communications system illustrated in FIG. 22. In FIG. 21, a spectrum $r_1(t)$ is a spectrum of a high-frequency phase-modulated signal output from the first base station 2500. A spectrum $r_2(t)$ is a spectrum of a high-frequency phase-modulated signal output from the second base station 2501. A spectrum $r_{i-1}(t)$ is a spectrum of a high-frequency phase-modulated signal output from the (i−1)-th base station 2502. A spectrum $r_i(t)$ is a spectrum of a high-frequency phase-modulated signal output from the i-th base station 2503.

As described in the first embodiment, the high-frequency modulated signal may include two or more partial band high-frequency modulated signals. Therefore, the data receiving device of the present invention can extract at least one partial band, that is, m (m is a positive integer equal to or larger than 1 and equal to i or smaller than i) partial bands. For simplification in description, it is assumed in the following description that the data receiving device having incorporated therein a partial band extracting section for extracting two (m=2) partial bands is used in the mobile station 2504.

Here, it is assumed that the mobile station 2504 is to receive a high-frequency modulated signal output from the first base station 2500 and a high-frequency modulated signal output from the second base station 2501. The frequency converter circuit 105 illustrated in FIG. 1 is supplied with a high-frequency modulated signal having frequency components represented by a virtual spectrum R(t) including all bands covered by the spectrum $r_1(t)$ through the spectrum $r_i(t)$. Under such circumstances, the frequency converter circuit 105 regards, as a high-frequency modulated signal to be received, a high-frequency modulated signal having frequency components represented by a virtual spectrum r(t) having a center frequency of $f_i$ and including the spectrum $r_1(t)$ and the spectrum $r_2(t)$. Then, the frequency converter circuit 105 frequency-converts the virtual spectrum r(t) so that the center frequency of $f_i$ is 0. That is, the frequency converter circuit 105 performs frequency conversion so that the spectrum $r_1(t)$ is a spectrum 2601, the spectrum $r_2(t)$ is a spectrum 2602, the spectrum $r_{i-1}(t)$ is a spectrum 2603, and the spectrum $r_i(t)$ is a spectrum 2604, and the virtual spectrum r(t) is a virtual spectrum 2600. Consequently, as with the first embodiment, the data receiving device 1 in the mobile station 2504 outputs an in-phase component data string $BI_1(nT)$ and a quadrature component data string $BQ_1(nT)$ of a partial band detection signal, that is, a component baseband signal having components of only the spectrum 2601. Also, the data receiving device 1 outputs an in-phase component data string $BI_2(nT)$ and a quadrature component data string $BQ_2(nT)$ of a partial band detection signal which is a component baseband signal having components of only the spectrum 2602.

An output side of each of the first delay detection operating section 103 and the second delay detection operating section 104 has connected thereto a decision circuit (not shown). The decision circuit (not shown) provided to the output side of the first delay detection operating section 103 performs a phase decision process based on the in-phase component data string $BI_1(nT)$ and the quadrature component data string $BQ_1(nT)$ output from the first delay detection operating section 103, and then outputs a received data string. The decision circuit (not shown) provided to the output side of the second delay detection operating section 104 performs a phase decision process based on the in-phase component data string $BI_2(nT)$ and the quadrature component data string $BQ_2(nT)$ output from the second delay detection operating section 104, and then outputs a received data string. That is, with the use of the data receiving device, the mobile station 2504 can simultaneously receive data from the first and second base stations 2500 and 2501 without requiring a plurality of receiving systems, which have been conventionally required.

In order to receive i separate high-frequency modulated signals to obtain received data from each of these signals, conventional receivers require i receiving systems. However, as described above, the mobile station, which is the wireless communication device of the present invention, only requires a single receiving system, thereby simultaneously obtaining received data from i separate high-frequency modulated signals.

Also, in order to extract m partial bands, the mobile station uses a data receiving device having incorporated therein a partial band extracting section for extracting m partial bands.

Furthermore, the first through i-th base stations 2500 through 2503 each can have a function as a mobile station. Also, the mobile station 2504 can have a function as a base station. In this case, the mobile station 2504 as a base station can simultaneously obtain received data from the base stations 2500 and 2501 as mobile stations.

Still further, when the mobile station using the data receiving device of the present invention simultaneously receives m high-frequency modulated signals as described above, it is possible to perform a data receiving process m times faster compared with a case where only one band is used for communications.

Still further, as described in the first embodiment, the data receiving device of the mobile station selects one of pieces of received data that is appropriate in accordance with the reception level, and then outputs the selected piece of data. With this, when a single high-frequency modulated signal is output from a single base station, the mobile station moving among areas covered by m base stations can select an appropriate one from these base stations for communications.

Seventh Embodiment

Figure 23:
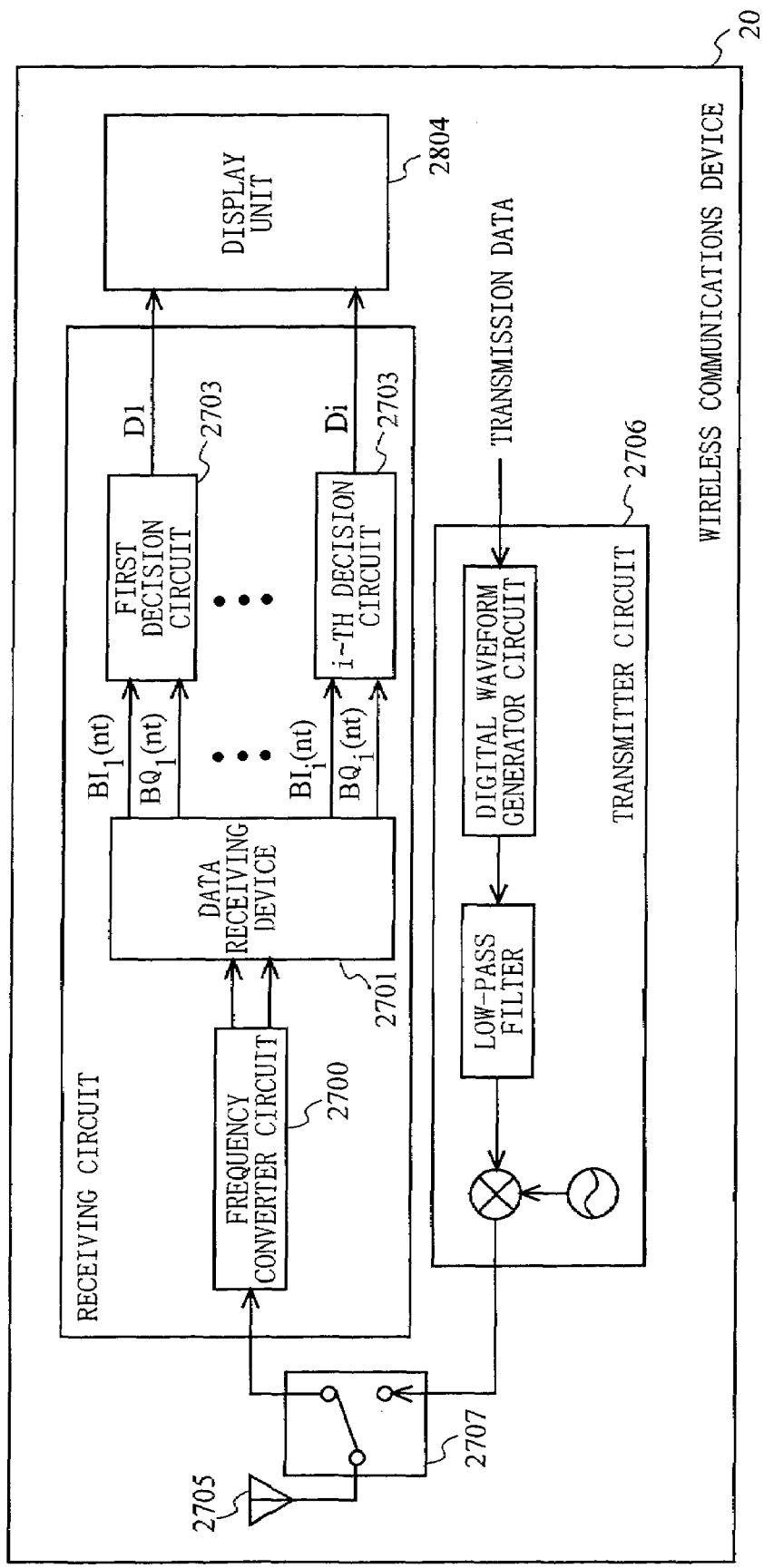
FIG. 23 is a block diagram illustrating an example of a structure of a wireless communications device 20 according to the seventh embodiment of the present invention, the communications device using the data receiving device according to any one of the embodiments of the present invention.

FIGS. 22 and 23 are block diagrams illustrating examples of structures of wireless communications devices 10 and 20, respectively, according to a seventh embodiment of the present invention. These communications devices 10 and 20 use the data receiving device according to any one of the embodiments of the present invention.

Figure 24:
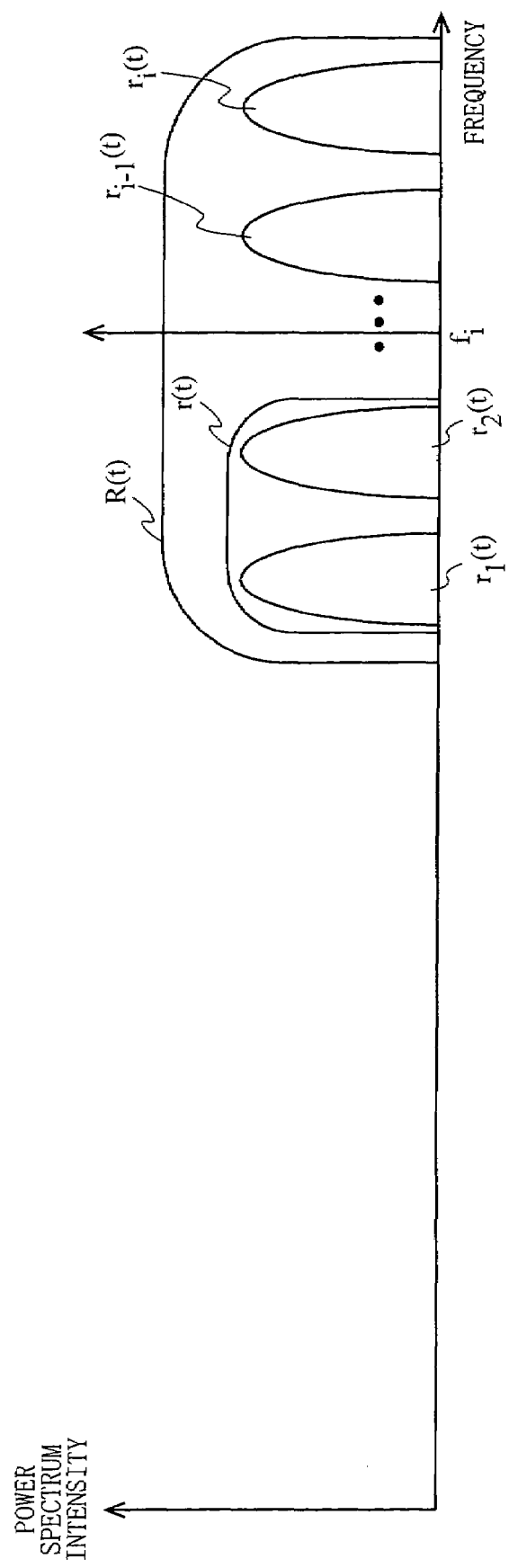
FIG. 24 is an illustration schematically showing a spectrum of a receive signal for describing the operations of the wireless communications devices 10 and 20 according to the seventh embodiment.
Figure 25:
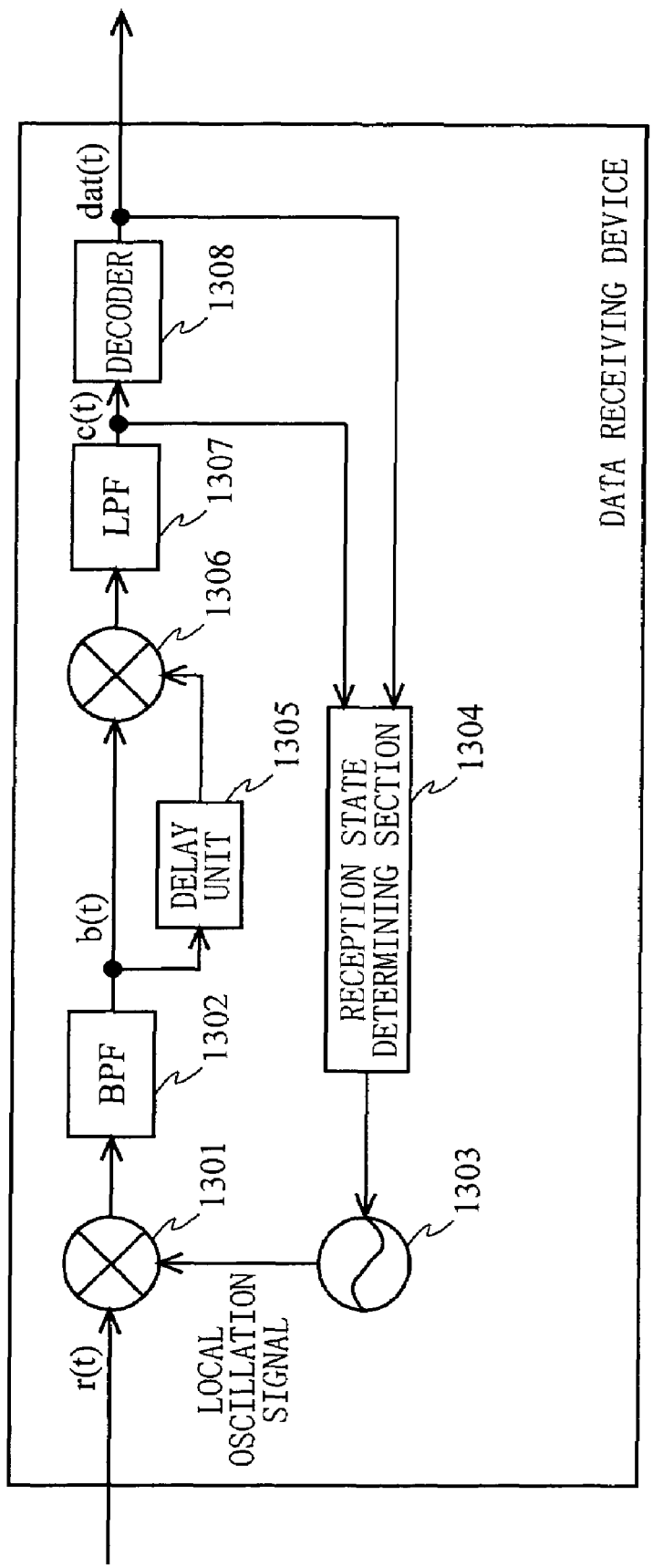
FIG. 25 is an illustration showing the configuration of a data receiving device disclosed in Japanese Patent No. 3161146.
Figure 26:
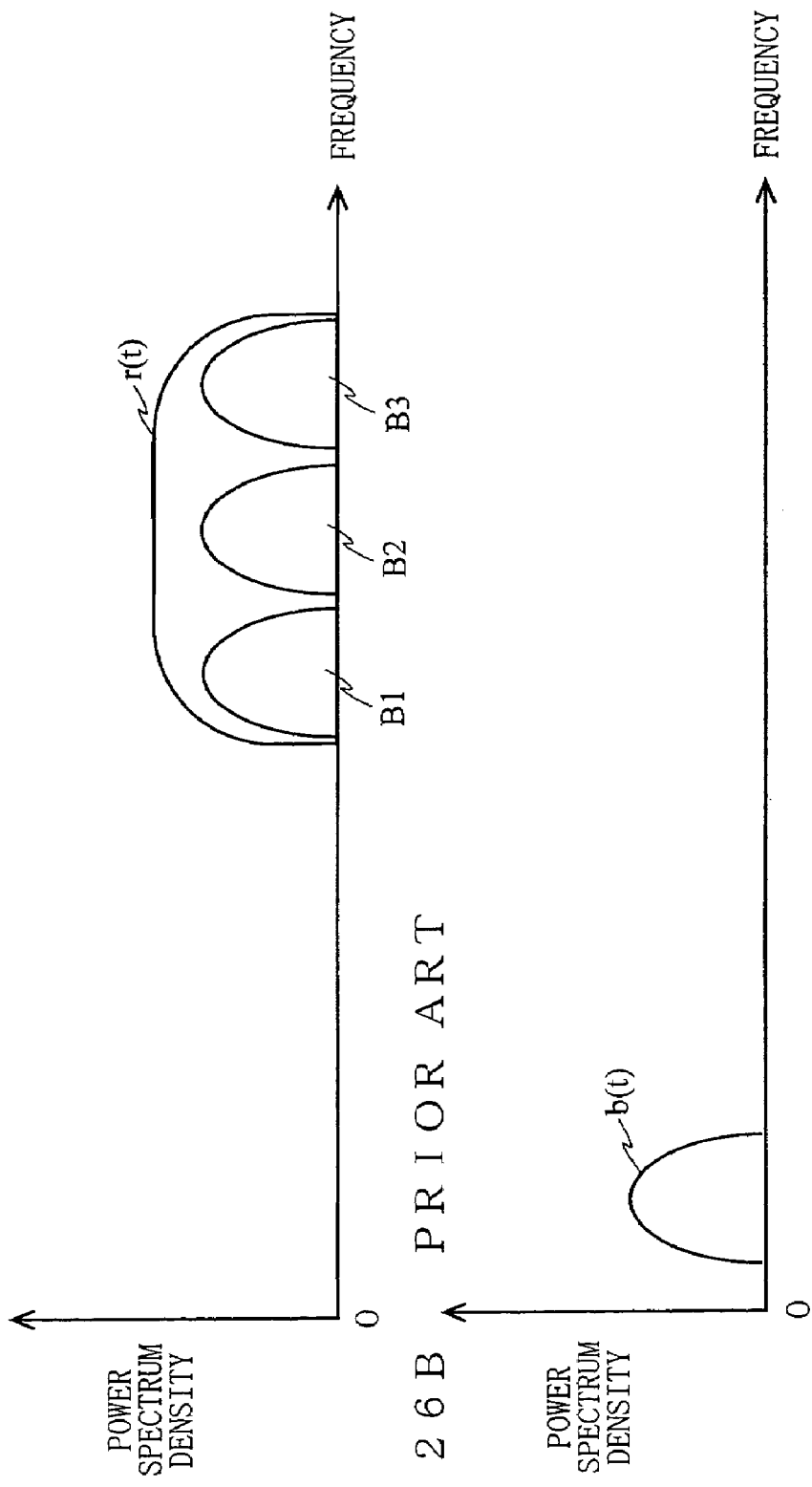
FIGS. 26A and 26B are illustrations showing spectrums of signals at main portions of the data receiving device illustrated in FIG. 25.

First, with reference to FIGS. 22 and 24, the operation of the wireless communications device 10 is described. In FIG. 22, the wireless communications device 10 includes a frequency converter circuit 2700, the data receiving device 2701 according to any one of the embodiments of the present invention, first through i-th decision circuits 2703, a received data integration circuit 2704, an antenna 2705, a transmitter circuit 2706, and a transmission/reception switching unit 2707. The wireless communications device 10 receives a virtual high-frequency modulated signal R(t) illustrated in FIG. 24, the signal including frequency components represented by spectra $r_1(t), r_2(t), \ldots, r_i(t)$ (i is a positive integer).

The frequency converter circuit 2700 performs frequency-conversion so that a center frequency $f_i$ of the virtual high-frequency modulated signal R(t) is 0. The partial band extracting section of the partial receiving device 2701 extracts a band of each of the spectra $r_1(t), r_2(t), \ldots, r_i(t)$ included in the virtual high-frequency modulated signal R(t). Each delay detection operating section of the data receiving device 2701 outputs a quadrature component data string and an in-phase component data string that correspond to each band extracted by the partial band extracting section.

The first through i-th decision circuits 2703 output data D1 through Di, respectively, based on each received quadrature component data string and in-phase component data string.

Now, it is assumed that the transmission/reception switching unit 2707 is set so that the antenna 2705 and the receiver circuit are connected to each other. In this case, the first through i-th decision circuits 2703 each output received data Dk (k=1, . . . , i) corresponding to the high-frequency modulated signal having frequency components represented by a spectrum $r_k(t)$.

Here, it is also assumed that a transmitter (not shown) for transmitting a signal to the wireless communication device 10 divides in advance transmission data TXD into i pieces of transmission data $TXD_1$ through $TXD_i$, and then transmits such transmission data $TXD_k$ as a high-frequency modulated signal having frequency components represented by the spectrum $r_k(t)$. That is, it is assumed that the received data Dk is identical to the transmission data $TXD_k$ itself, which has been divided at the transmitting side.

The received data integration circuit 2704 integrates the received data D1 through Di to generate transmission data TXD before division, and then outputs the resultant data as the received data.

As such, with the data receiving device of the present invention being incorporated in the wireless communications device, it is possible to perform a data receiving process i times faster compared with a case where communication is performed by using only the band represented by the spectrum $r_i(t)$.

Next, with reference to FIGS. 23 and 24, the operation of the wireless communications device 20 is described. Note that, in FIG. 23, portions having the same function as that of the portions of the wireless communications device illustrated in FIG. 22 are provided with the same reference numerals. The wireless communications device 20 includes the frequency converter circuit 2700, the data receiving device 2701 according to any one of the embodiments of the present invention, the first through i-th decision circuits 2703, a display unit 2804, the antenna 2705, the transmitter circuit 2706, and the transmission/reception switching unit 2707. The wireless communications device 20 receives the virtual high-frequency modulated signal R(t) including frequency components represented by spectra $r_1(t), r_2(t), \ldots, r_i(t)$ (i is a positive integer). As with the wireless communications device 10, the wireless communications device 20 obtains the received data Dk corresponding to the high-frequency modulated signal having the frequency components represented by the spectrum $r_k(t)$. Based on the obtained i pieces of received data Dk (k=1, . . . , i), the display unit 2804 in the wireless communications device 20 displays the contents of the received data.

In this way, with the wireless communications device being incorporated in the data receiving device of the present invention, it is possible to simultaneously perform a plurality of signal processes with only a single receiving system, and to perform a concurrent process on the obtained pieces of received data for display.

Therefore, by using the data receiving device of the present invention for the wireless communications device, it is possible to increase a data transmission speed and perform a concurrent process on a plurality of pieces of received data only with a single receiving system.

While the invention has been described in detail, the foregoing description is in all aspects illustrative and not restrictive. It is understood that numerous other modifications and variations can be devised without departing from the scope of the invention.

What is claimed is:

1. A data receiving device which is supplied with an in-phase signal and a quadrature signal that are obtained by quadrature detecting a frequency-converted phase-modulated signal, and outputs a detection signal, the data receiving device comprising:
    a first sampler for sampling the in-phase signal at every predetermined sampling period and outputting the sampled in-phase signal;
    a second sampler for sampling the quadrature signal at every said predetermined sampling period and outputting the sampled quadrature signal;
    a partial band extracting section structured by a complex filter for extracting at least one partial band, whose center frequency is not 0, from frequency components included in the sampled in-phase signal output from the first sampler and the sampled quadrature signal output from the second sampler, separating a signal of the extracted partial band into an in-phase component and a quadrature component, and outputting the in-phase component and the quadrature component as a partial band signal; and
    a detecting section for receiving the partial band signal, whose center frequency is not 0, output from the partial band extracting section, and for outputting the detection signal,
    wherein the detecting section does not perform frequency conversion on the received partial band signal.

2. The data receiving device according to claim 1, wherein the detecting section performs a delay detecting process based on the partial band signal output from the partial band extracting section.

3. The data receiving device according to claim 2, wherein the partial band extracting section extracts the partial band so that a center frequency of the partial band signal has a value of an integral multiple of a symbol frequency of transmission data.

4. The data receiving device according to claim 3, wherein the detecting section includes:
    a delay unit for delaying the in-phase component of the partial band signal output from the partial band extracting section by one symbol time and outputting the delayed in-phase component;
    a first multiplier for multiplying the in-phase component of the partial band signal output from the partial band extracting section by the delayed in-phase component and outputting the multiplication result as an in-phase component data string;
    a second multiplier for multiplying the quadrature component of the partial band signal output from the partial band extracting section by the delayed in-phase component and outputting the multiplication result as a quadrature component data string;
    a first low-pass filter for filtering a high-frequency component of the in-phase component data string output from the first multiplier; and
    a second low-pass filter for filtering a high-frequency component of the quadrature component data string output from the second multiplier.

5. The data receiving device according to claim 3, wherein the partial band extracting section extracts the partial band so that the number of samplings within one symbol period has a value obtained by dividing the center frequency of the partial band signal by a symbol frequency and then multiplying the division result by 8.

6. The data receiving device according to claim 2, wherein the partial band extracting section extracts an even number of partial bands and outputs an even number of partial band signals, and two of the partial band signals form a pair of signals whose center frequencies are a positive frequency and a negative frequency that are equally distanced apart from a frequency of 0.

7. The data receiving device according to claim 6, wherein the partial band extracting section includes:

a first filtering unit structured by a first complex filter for finding a convolutional integral of the sampled in-phase signal and a quadrature component of a transfer function of the first complex filter;

a second filtering unit structured by a second complex filter for finding a convolutional integral of the sampled quadrature signal and an in-phase component of a transfer function of the second complex filter;

a third filtering unit structured by a third complex filter for finding a convolutional integral of the sampled quadrature signal and a quadrature component of a transfer function of the third complex filter;

a fourth filtering unit structured by a fourth complex filter for finding a convolutional integral of the sampled in-phase signal and a quadrature component of a transfer function of the fourth complex filter;

a first subtractor for subtracting a signal output from the second filtering unit from a signal output from the first filtering unit;

a first adder for adding the signal output from the first filtering unit and the signal output from the second filtering unit;

a second subtractor for subtracting a signal output from the fourth filtering unit from a signal output from the third filtering unit; and a second adder for adding the signal output from the third filtering unit and the signal output from the fourth filtering unit.

8. The data receiving device according to claim 7, wherein the partial band extracting section extracts the partial band so that a center frequency of the partial band signal has a value of an integral multiple of a symbol frequency of transmission data.

9. The data receiving device according to claim 7, wherein the partial band extracting section extracts the partial band so that the number of samplings within one symbol period has a value obtained by dividing a center frequency of the partial band signal by a symbol frequency and then multiplying the division result by 8.

10. The data receiving device according to claim 6, wherein the partial band extracting section includes:

a first input selector, supplied with the sampled in-phase signal and the sampled quadrature signal, for alternately selecting and outputting the sampled in-phase signal and the sampled quadrature signal at every half of the sampling period;

a second input selector, supplied with the sampled in-phase signal and the sampled quadrature signal, for alternately selecting and outputting the sampled in-phase signal and the sampled quadrature signal at every half of the sampling period;

a first filtering unit structured by a first complex filter for finding a convolutional integral of the signal output from the first input selector and an in-phase component of a transfer function of the first complex filter;

a second filtering unit structured by a second complex filter for finding a convolutional integral of the signal output from the second input selector and a quadrature component of a transfer function of the second complex filter;

a first output selector for outputting the signal output from the first filtering unit and varied at every half of the sampling period alternately to a first output terminal and a second output terminal of the first output selector;

a second output selector for outputting the signal output from the second filtering unit and varied at every half of the sampling period alternately to a third output terminal and a fourth output terminal of the second output selector;

a first delay unit for delaying the signal output from the first output terminal of the first output selector by a time which is half of the sampling period;

a second delay unit for delaying the signal output from the third output terminal of the second output selector by the time which is half of the sampling period;

a first subtractor for subtracting the delayed signal output from the second delay unit from the delayed signal output from the first delay unit;

a first adder for adding the delayed signal output from the first delay unit and the delayed signal output from the second delay unit;

a second subtractor for subtracting the signal output from the fourth output terminal of the second output selector from the signal output from the second output terminal of the first output selector; and a second adder for adding the signal output from the second output terminal of the first output selector and the signal output from the fourth output terminal of the second output selector.

11. The data receiving device according to claim 10, wherein the partial band extracting section extracts the partial band so that a center frequency of the partial band signal has a value of an integral multiple of a symbol frequency of transmission data.

12. The data receiving device according to claim 10, wherein the partial band extracting section extracts the partial band so that the number of samplings within one symbol period has a value obtained by dividing the a center frequency of the partial band signal by a symbol frequency and then multiplying the division result by 8.

13. The data receiving device according to claim 2, wherein the detecting section performs a delay detecting process by using the partial band signal output from the partial band extracting section as an intermediate signal.

14. The data receiving device according to claim 1, wherein the frequency-converted phase-modulated signal is a signal having a frequency band from which at least one partial band is extracted to obtain a partial band signal that can be demodulated.

15. The data receiving device according to claim 1, wherein the frequency-converted phase-modulated signal is a spread spectrum signal.

16. The data receiving device according to claim 13, wherein the frequency-converted phase-modulated signal is a spread spectrum signal obtained by using, as a spreading signal, a chirp signal obtained through repeated sweeping of a sine-wave frequency at every predetermined period.

17. A wireless communications device for receiving and processing a phase-modulated signal, the wireless communications device comprising:
- a frequency converter circuit for frequency-converting and then quadrature-detecting the received phase-modulated signals and then outputting an in-phase signal and a quadrature signal;
- a data receiving device for receiving the in-phase signal and the quadrature signal output from the frequency converting circuit and outputting a detection signal; and
- a phase decision processing device for deciding a phase of the detection signal output from the data receiving device; wherein the data receiving device includes:
- a first sampler for sampling the in-phase signal at every predetermined sampling period and outputting a sampled in-phase signal;
- a second sampler for sampling the quadrature signal at every said predetermined period and outputting a sampled quadrature signal;
- a partial band extracting section structured by a complex filter for extracting at least one partial band, whose center frequency is not 0, from frequency components included in the sampled in-phase signal output from the first sampler and frequency components included in the sampled quadrature signal output from the second sampler, separating a signal of the extracted partial band into an in-phase component and a quadrature component, and outputting the in-phase component and the quadrature component as a partial band signal; and
- a detecting section for receiving the partial band signal, whose center frequency is not 0, output from the partial band extracting section, and for outputting the detection signal,
- wherein the detecting section does not perform frequency conversion on the received partial band signal.

18. The wireless communications device according to claim 17,
wherein the detecting section performs a delay detecting process based on the partial band signal output from the partial band extracting section.

19. The wireless communications device according to claim 18, wherein
the partial band extracting section extracts a plurality of partial bands and outputs a plurality of partial band signals of the partial bands, and
the phase decision processing device selects one of a plurality of pieces of data obtained through phase decision performed on a plurality of detection signals output from the detecting section.

20. The wireless communications device according to claim 18, wherein
the partial band extracting section extracts a plurality of partial bands and outputs a plurality of partial band signals of the partial bands, and
the phase decision processing device generates received data based on a plurality of pieces of data obtained through phase decision performed on a plurality of detection signals output from the detecting section.

21. The wireless communications device according to claim 18, wherein
the partial band extracting section extracts a plurality of partial bands and outputs a plurality of partial band signals of the partial bands, and
the phase decision processing device performs a concurrent process on a plurality of pieces of data obtained through phase decision performed on a plurality of detection signals output from the detecting section.

* * * * *